United States Patent
Riemann et al.

(10) Patent No.: US 6,291,003 B1
(45) Date of Patent: *Sep. 18, 2001

(54) METHOD AND APPARATUS FOR STEAM PASTEURIZATION OF MEAT

(75) Inventors: M. James Riemann, Derby, KS (US); James Mitchell, Melrose, NM (US); Dick R. Farmer, Derby, KS (US); Kelly E. Lacy, Eaton, CO (US)

(73) Assignee: Excel Corporation, Wichita, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,272

(22) Filed: Oct. 30, 1998

(51) Int. Cl.[7] ............................. A23L 1/10; A23L 1/20; A23L 1/216
(52) U.S. Cl. .................. 426/511; 426/521; 426/644; 422/26; 99/470; 99/471
(58) Field of Search ................................. 426/511, 521, 426/644; 422/26; 99/470, 471

(56) References Cited

U.S. PATENT DOCUMENTS

| 603,082 | 4/1898 | Henkel et al. . |
| 1,146,589 | 7/1915 | Morrison . |

(List continued on next page.)

FOREIGN PATENT DOCUMENTS

| 2497072 | * 7/1982 | (FR) . |
| 2 497 072 | 7/1982 | (FR) . |
| 2 603 775 | 3/1988 | (FR) . |
| 338768 | 11/1930 | (GB) . |
| 1072430 | 6/1967 | (GB) . |
| 1199557 | 7/1970 | (GB) . |
| 2 182 461 | 5/1987 | (GB) . |
| 2 240 912 | 8/1991 | (GB) . |
| 58-162264 | 9/1983 | (JP) . |
| WO 96/13983 | 5/1996 | (WO) . |
| WO 98/10659 | 3/1998 | (WO) . |

OTHER PUBLICATIONS

Gill, C. O., et al., "The hygienic and organoleptic qualities of ground beef prepared from manufacturing beef pasteurized by immersion in hot water", *Meat Science*, 46(1):67–75 (1997).

Sachindra, N.M., et al., "Reduction in microbial load on buffalo meat by hot water dip treatment", *Meat Science*, 48(1/2):149–157 (1998).

Smith, M. G., et al., "Destruction of *Escherichia coli* on sides of beef by a hot water decontamination process", *Food Australia*, 42(4):195–198 (Apr. 1990).

Thomson, J.E., et al., "Phosphate and heat treatments to control *salmonella* and reduce spoilage and rancidity on broiler carcasses", *Poultry Science*, 58:139–143 (1979).

Primary Examiner—Nina Bhat
(74) Attorney, Agent, or Firm—Merchant & Gould P.C.

(57) ABSTRACT

Methods and apparatuses are presented for the steam pasteurization of the meat to heat the surface of the meat and reduce surface contamination. One example of an apparatus for reducing surface contamination of meat includes a dewatering region, a steam region, a coolant region, and a controller. The dewatering region includes at least one dewatering element for directing a dewatering fluid at a piece of meat to remove surface water from the meat. The steam region includes at least one steam valve for directing steam at the piece of meat to heat the surface of the meat. The coolant region has at least one coolant element for directing a coolant fluid at the piece of meat to cool the meat. The controller is configured and arranged to control a conveyor to move the piece of meat from the dewatering region to the steam region, to stop the piece of meat in the steam region while steam is directed at the piece of meat, and to move the meat from the steam region to the coolant region.

29 Claims, 17 Drawing Sheets

U.S. PATENT DOCUMENTS

| | | |
|---|---|---|
| 1,848,596 | 8/1932 | Allbright . |
| 1,850,031 | 3/1932 | Rayson . |
| 2,060,423 | 11/1936 | McKee et al. . |
| 2,631,520 | 3/1953 | Geerling . |
| 2,978,738 | 4/1961 | Jönsson . |
| 3,135,016 | 6/1964 | Erkstam et al. . |
| 3,178,763 | 4/1965 | Kolman . |
| 3,343,477 | 9/1967 | Ekstam . |
| 3,522,058 | 7/1970 | Libby . |
| 3,523,326 | 8/1970 | Ambill . |
| 3,631,563 | 1/1972 | Snowden . |
| 3,694,856 | 10/1972 | Kaufman et al. . |
| 3,705,813 | 12/1972 | Vogel et al. . |
| 3,934,044 | 1/1976 | Busch et al. . |
| 3,961,086 * | 6/1976 | Turbak ................................ 426/240 |
| 3,996,386 | 12/1976 | Malkki et al. . |
| 4,045,579 | 8/1977 | Rogers . |
| 4,234,537 | 11/1980 | Hersom et al. . |
| 4,254,152 | 3/1981 | Janovtchik . |
| 4,255,459 | 3/1981 | Glen . |
| 4,337,549 | 7/1982 | Anderson et al. . |
| 4,473,004 | 9/1984 | Wells et al. . |
| 4,556,572 | 12/1985 | Kaufman, Jr. et al. . |
| 4,636,395 * | 1/1987 | Robinson, Jr. et al. ............. 426/511 |
| 4,731,908 | 3/1988 | Thorsen . |
| 4,752,487 * | 6/1988 | Collyer et al. ....................... 426/231 |
| 4,760,780 | 8/1988 | Silvestrini et al. . |
| 4,829,637 | 5/1989 | Norrie . |
| 4,868,950 | 9/1989 | Harben, Jr. . |
| 4,902,522 | 2/1990 | Radibaugh . |
| 4,933,200 | 6/1990 | Shimizu . |
| 4,965,911 | 10/1990 | Davey . |
| 4,966,072 | 10/1990 | Ellis-Brown . |
| 5,043,175 | 8/1991 | Bayley et al. . |
| 5,045,021 | 9/1991 | Borup . |
| 5,072,663 | 12/1991 | Ellis-Brown . |
| 5,093,140 | 3/1992 | Watanabe . |
| 5,184,538 | 2/1993 | Ledet . |
| 5,281,428 | 1/1994 | Morgan . |
| 5,439,694 | 8/1995 | Morris, Jr. . |
| 5,503,594 | 4/1996 | Karubian et al. . |
| 5,607,349 | 3/1997 | Karubian et al. . |
| 5,651,730 | 7/1997 | McGinnis et al. . |
| 5,711,981 * | 1/1998 | Wilson et al. ....................... 426/511 |

* cited by examiner

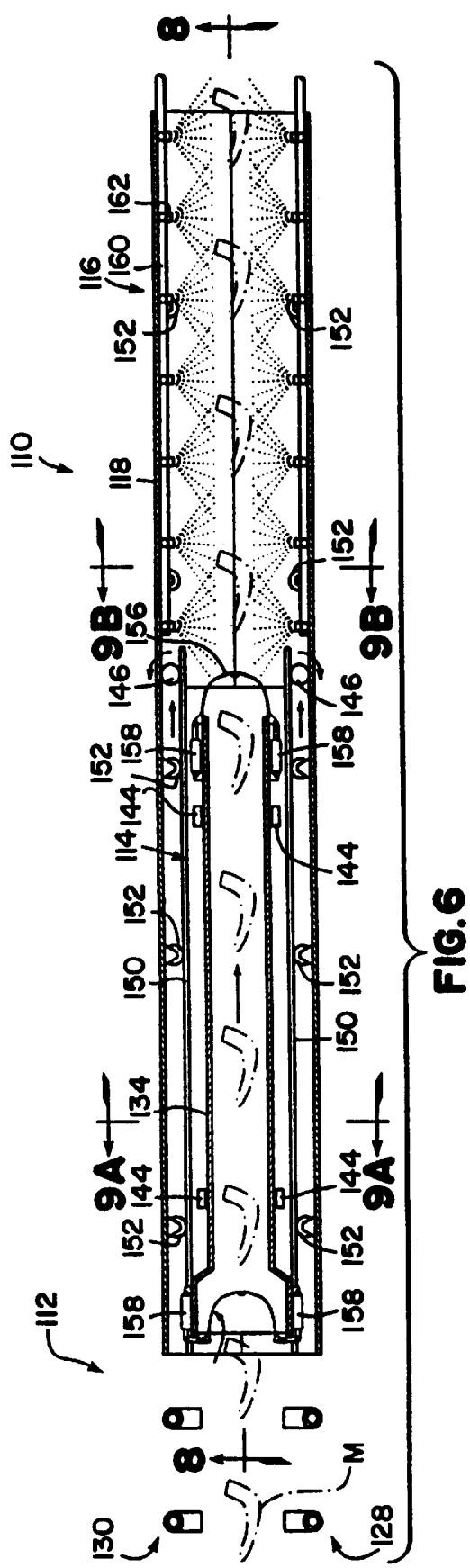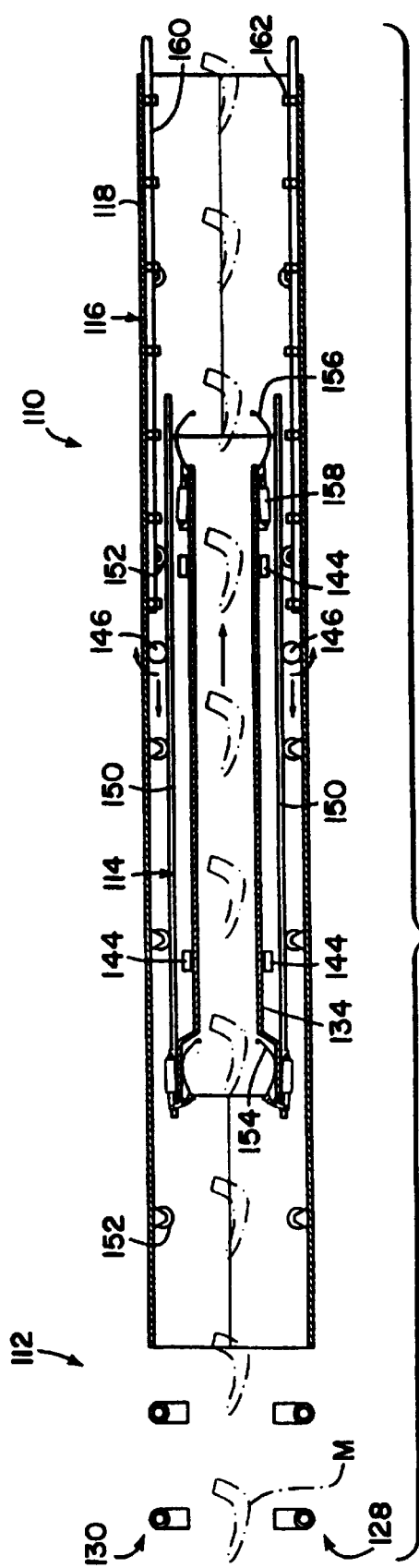

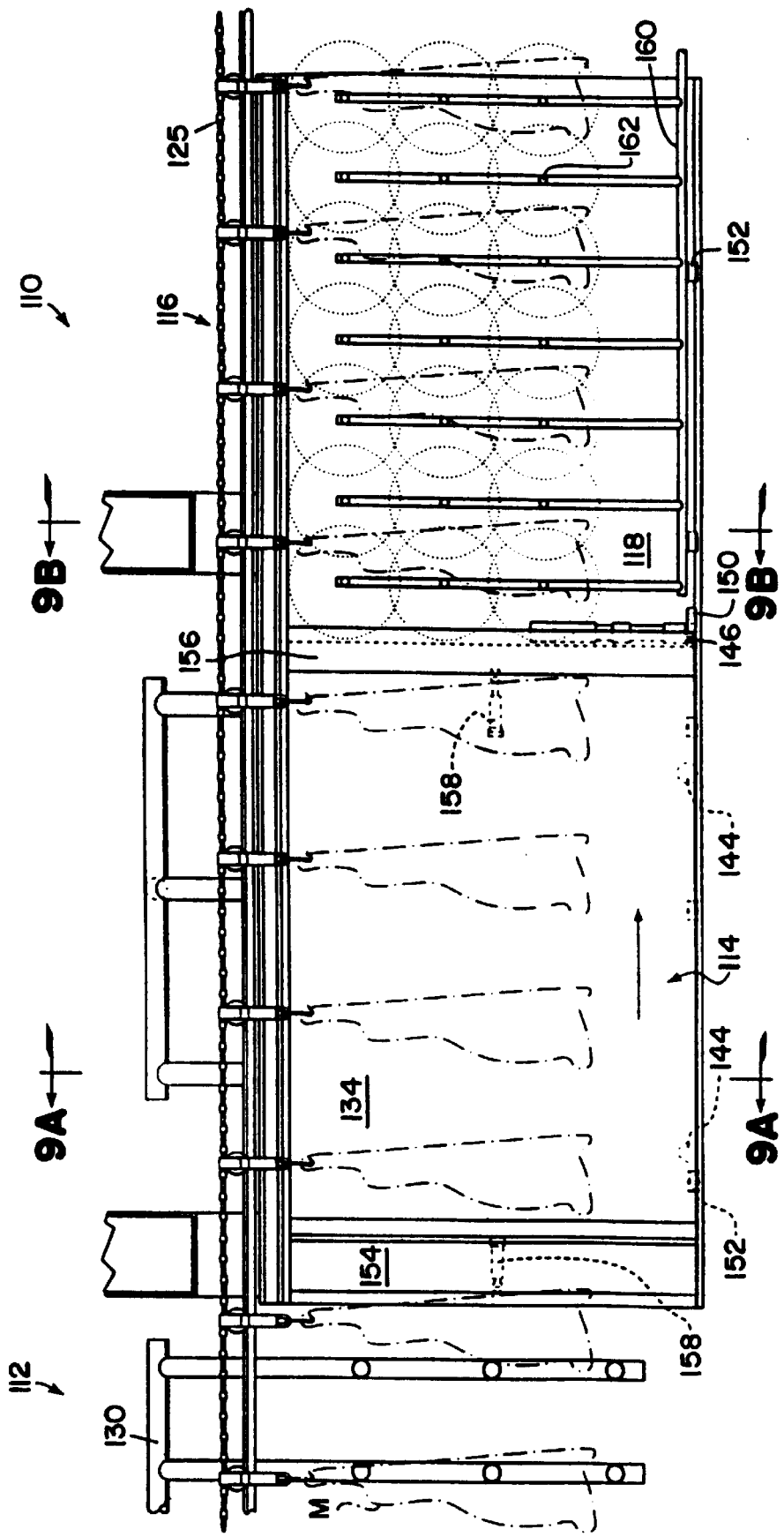

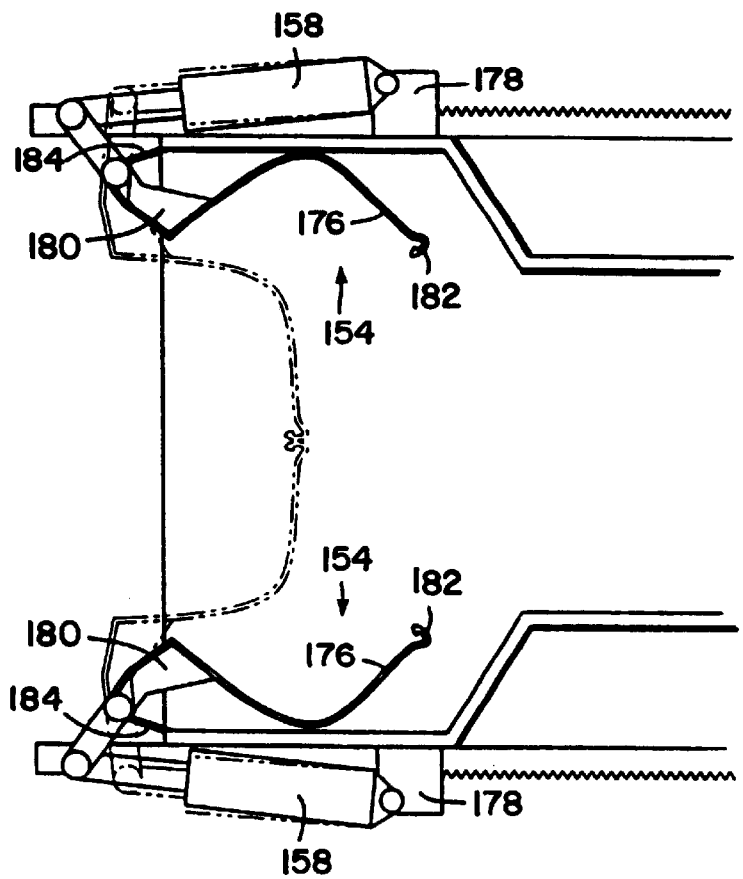
FIG.11A
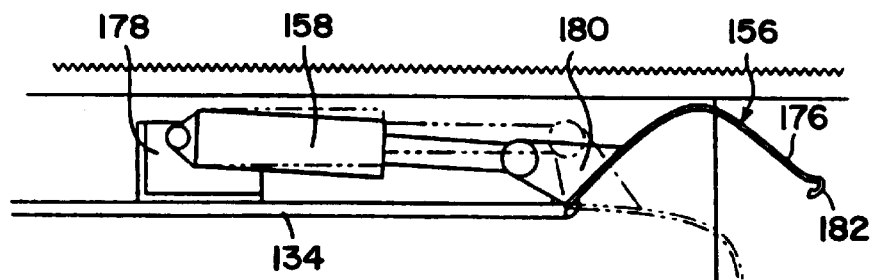
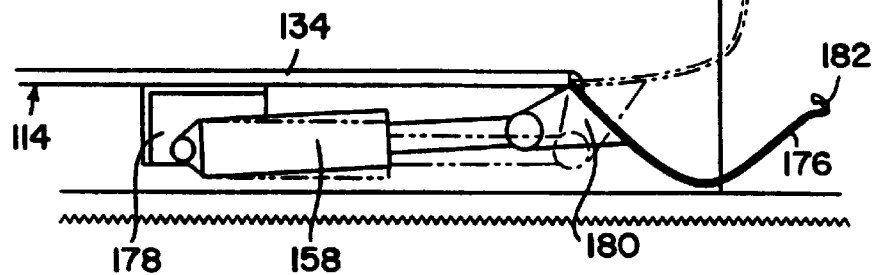
FIG.11B

METHOD AND APPARATUS FOR STEAM PASTEURIZATION OF MEAT

FIELD OF THE INVENTION

This invention relates generally to apparatuses and processes for cleaning meat, and more particularly, to a processor and method for destroying coliform bacteria and other surface pathogens on meat.

BACKGROUND OF THE INVENTION

Concerns over pathogens on meat have been elevated in recent years due to *E-coli* related illnesses and deaths. In response, certain regulations have been imposed on food preparers and recommendations have been made to increase the likelihood that pathogens are killed. For example, restaurants must cook hamburger at 160° F. throughout for at least five seconds.

Such end user regulations have been made in an attempt to correct a problem that begins during meat processing. *E-coli*, other coliform bacteria, and many other pathogens reside on the surface of meat beginning with the meat carcass processing. The pathogens originate from fecal matter and other contaminants on the surface of the meat. Without adequately destroying these pathogens, the meat is processed, packed, and shipped to the distributor, retailer, or consumer. It is then left to the consumer or preparer of the meat to address a problem that by then can be even worse. The bacteria may have further grown or may reside throughout the meat. This is the case, for example, with ground meat since during meat processing the surface pathogens are distributed throughout the meat.

The only precaution currently taken by the meat processors is to spray the carcasses with water at 120–140° F. This measure is not necessarily effective or efficient at destroying the surface pathogens. Not all pathogens are killed at these temperatures and large volumes of water are required, along with a large amount of energy to heat the water, since the water cannot easily be recirculated if contaminants are to be avoided.

An apparatus has been developed to steam pasteurize meat. This apparatus includes a steam pasteurization chamber that moves in synchronization with a conveyor containing the meat. It has been found that operation of this device may result in breakdowns and does not ensure that the meat has been heated to a sufficient temperature. There is a need for methods and apparatuses that operate more reliably and with controls to heat the meat to sufficient temperature to reduce surface contamination.

SUMMARY OF THE INVENTION

The difficulties and drawbacks of the prior art methods and apparatuses for destroying coliform and other pathogenic bacteria on the surface of meat such as beef, poultry, pork and other meat products may be overcome by the apparatuses and methods of the present invention. The apparatuses and methods of the present invention destroy pathogenic bacteria and other harmful contaminants on all the surface areas of the meat without introducing chemicals or other harmful and expensive products into the process. The methods and apparatuses are also carried out effectively and inexpensively.

One embodiment of the invention includes a method of reducing surface contamination of meat. A surface of a piece of meat is dewatered using a dewatering fluid. The piece of meat is moved into a stationary steam region of a contamination-reducing apparatus. The piece of meat is then stopped within the steam region. Steam is directed toward the piece of meat to heat the surface of the piece of meat. The piece of meat is then moved out of the steam region and a coolant fluid is directed toward the piece of meat to cool the surface of the piece of meat. In some instances, the steam is discontinued after the steam region has achieved a threshold pasteurization temperature and the steam has been directed at the meat for at least a minimum pasteurization time.

Another method of reducing surface contamination of meat includes dewatering a surface of a piece of meat using a dewatering fluid. The piece of meat is moved into a stationary steam region of a contamination-reducing apparatus. The piece of meat is then stopped within the steam region. First and second steam valves are opened to direct steam toward the piece of meat to heat the surface of the piece of meat. The piece of meat is then moved out of the steam region and a coolant fluid is directed toward the piece of meat to cool the surface of the piece of meat. In some instances, the second steam valve is closed after a valve let down time and the steam from the first steam valve is discontinued after the steam region has achieved a threshold pasteurization temperature and the steam has been directed at the meat for at least a minimum pasteurization time. If the steam region does not achieve a threshold pasteurization temperature, the second steam valve is reopened. In some cases, if the steam region does not achieve the threshold pasteurization temperature by a maximum pasteurization time after the second steam valve is opened, an alarm is activated.

An apparatus for reducing surface contamination of meat includes a dewatering region, a steam region, a coolant region, and a controller. The dewatering region includes at least one dewatering element for directing a dewatering fluid at a piece of meat to remove surface water from the meat. The steam region includes at least one steam valve for directing steam at the piece of meat to heat the surface of the meat. The coolant region has at least one coolant element for directing a coolant fluid at the piece of meat to cool the meat. The controller is configured and arranged to control a conveyor to move the piece of meat from the dewatering region to the steam region, to stop the piece of meat in the steam region while steam is directed at the piece of meat, and to move the meat from the steam region to the coolant region.

Another method of reducing surface contamination of meat includes opening an entrance door to a stationary steam region of a contamination-reducing apparatus and moving the meat into the stationary steam region. The entrance door is closed and steam is directed toward the meat to increase a surface temperature of the meat to destroy, for example, coliform and other pathogenic bacteria. The temperature in the steam region achieves at least a threshold pasteurization temperature. An exit door is then opened and the meat is moved out of the steam region. The meat is then typically cooled using a coolant fluid to prevent substantial cooking at the surface of the meat.

The above summary of the present invention is not intended to describe each illustrated embodiment or every implementation of the present invention. The Figures and the detailed description which follow more particularly exemplify these embodiments.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a top view of the processor of FIG. 5 showing a steam chamber in a retracted position;

FIG. 7 is a top view of the processor of FIG. 5 showing the steam chamber being retracted as the meat continues to move in a downstream direction;

FIG. 8 is a cross-sectional elevational view showing the steam chamber in the position shown in FIG. 6;

FIG. 11A is an enlarged, fragmentary top view showing the entrance door;

FIG. 11B is an enlarged, fragmentary top view showing the exit door, and

DETAILED DESCRIPTION OF THE ILLUSTRATED EMBODIMENTS

Figure 1:
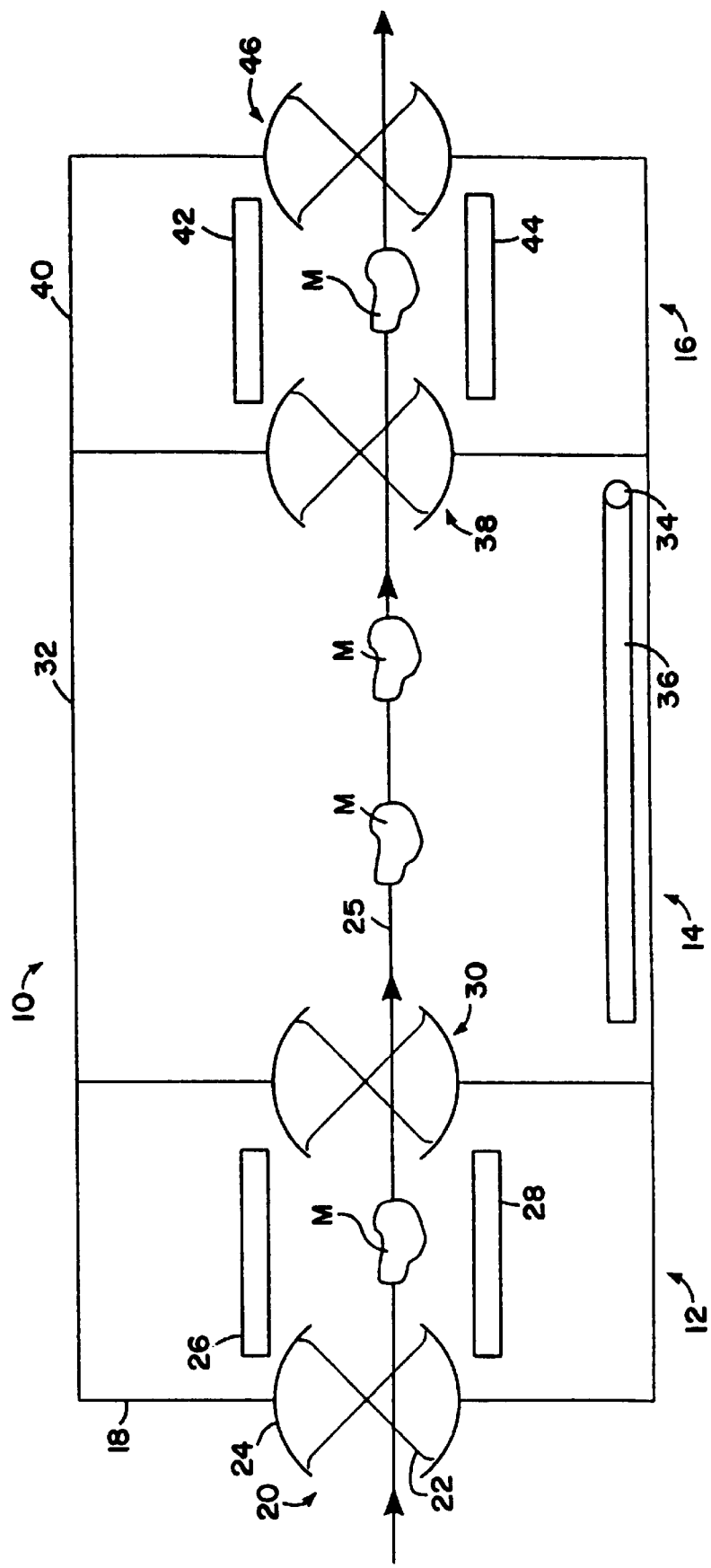
FIG. 1 is a schematic plan view of the process and apparatus of the present invention illustrating the movement of a side of beef along an overhead conveyor through the various chambers of the present invention.

The present invention is believed to be useful in the reduction of surface contamination of meat, including beef, pork, and chicken. In particular, the present invention is directed to methods and apparatuses for the steam pasteurization of the meat to heat the surface of the meat and reduce surface contamination. The present invention is described with respect to a previous apparatus and method which is modified according to the invention. However, it will be understood that other apparatuses and methods may be prepared according to the invention.

One example of an apparatus for destroying pathogens on meat includes a dewatering region, a stationary steam region, a coolant region, a meat conveyor, and a controller for controlling the movement of meat through the apparatus. The dewatering region includes, for example, an air blower with nozzles for blowing air at the surface of the meat to remove surface water from the meat. The steam region is disposed adjacent the dewatering region. The steam region may include a steam chamber that is sealed for maintaining a positive pressure in the steam region relative to the dewatering region. The steam region also includes a steam supply line for filling and maintaining the steam region with steam. The coolant region is disposed adjacent the steam region opposite from the dewatering region. The coolant region has nozzles for spraying, for example, chilled water onto the surface of the meat for rapidly cooling the meat, after it is passed through the steam region. The meat conveyor extends through the dewatering region, the steam region, and the coolant region. The meat conveyor supports the meat and transfers it from region to region.

The steam region may further include a floor that is sloped to collect the condensate that drips from the meat. At the lowest point in the floor a pressure retaining drain allows the water to be channeled away from the steam region without release of pressure therefrom. The steam chamber may also include pressure retaining entrance and exit doors to maintain the positive pressure in the steam region as meat enters and exits the steam region. The steam region may also include a steam distribution system extending along the length of the steam chamber and including outlets to dispense steam into the steam region.

The air nozzles in the dewatering region are preferably arranged in banks on either side of the conveyor that transfers the meat, such that the meat is advanced between the two banks of air blower nozzles. An enclosure around these air nozzle banks is also preferably provided.

The coolant region may also include water spray banks on either side of the conveyor for spraying chilled water over the entire surface of the meat. An enclosure may also surround the chilled water sprayers to form a coolant region.

The process may be monitored by recording heat-treating conditions of the first unit of meat by ascertaining the initial surface temperature, the surface temperature as the meat is subject to the steam and the surface temperature after being chilled. The length of heat treatment may also be ascertained and recorded. Rather than measuring the surface temperature of each unit of meat within the steam chamber, this information may be determined by measuring the temperature within the steam region as the meat is being transferred into the steam region, during the steam treatment process and also during the cooling process. Standard temperature gauges may be utilized for monitoring the temperature within the steam region.

The steam chamber includes an entrance door attached thereto at the upstream end of the steam chamber. An exit door is also provided attached to the steam chamber at the downstream end. The exit door preferably includes curved panels with concave sides facing the interior of the steam chamber. The panels include actuators for opening and closing the steam chamber.

The cooling system preferably includes fluid jets attached to the frame. The fluid jets may be water jets, air jets or other types of jets.

The Previous Apparatus and Method

A schematic diagram of one preferred embodiment of the present invention is shown in FIG. 1. A processor 10 is provided to rid the surface of unskinned or skinned meat M of any pathogens, such as *E-coli* 0157:H7 and other coliform-type bacteria, listeria, and salmonella. Processor 10 includes three chambers: a dewatering chamber 12, a steam heating chamber 14, and a chilled water cooling chamber 16. Meat M passes through each of these chambers in series. After passing through chilled water chamber 16 meat M has been cleansed from surface bacteria and is ready to be further processed by cutting, packaging, freezing, or otherwise. Note that while the preferred embodiment refers to beef, other meat can be processed with the apparatus and method of the present invention, such as pork or poultry. Also, while in the preferred embodiment the meat passes through different chambers to be processed, the meat could remain stationary while the process steps are carried out with corresponding equipment.

The first section of processor 10 entered by meat M is dewatering chamber 12. Dewatering chamber 12 includes a dewatering chamber enclosure 18 to seal off dewatering chamber 12 from external moisture or pollution. A processor entrance door 20 is provided at one side of dewatering chamber enclosure 18 to allow meat M to pass into dewatering chamber 12. Processor entrance door 20, as well as the other doors referenced below, is constructed in a pinwheel fashion with a plurality of door arms 22 extending outwardly from a central vertical axis about which the arms 22 rotate. A shield 24 is formed in circular arc sections to engage the outer ends of door arms 22. Shield 24 includes arcuate portions on both sides of door arms 22 such that a positive closure of dewatering chamber 12 is always achieved as door arms 22 rotate. At least two of door arms 22 will always be in contact with shields 24 to enclose the entrance to the dewatering chamber 12.

Alternatively, dewatering chamber 12 may be omitted from processor 10. The meat M would then simply enter steam chamber 14 directly.

Meat M rides through processor entrance door 20 hanging from a conveyor 25. Conveyor 25 is preferably constructed in a known fashion as a standard meat conveyor with an overhead chain to move the product along a processing stream. However, other conveyor systems may also be used.

After meat M passes through processor entrance door 20 it travels along conveyor 25 between left and right air banks 26 and 28. Air banks 26 and 28 remove surface moisture from meat M prior to meat M entering into steam chamber 14. Further details of air banks 26 and 28 are discussed below in connection with FIG. 2.

Conveyor 25 then carries meat M to the exit side of dewatering chamber 12 and into the steam heating chamber entrance door 30. Steam chamber entrance door 30 closes the air path between dewatering chamber 12 and steam chamber 14 such that a positive seal is created between the two chambers. Steam chamber entrance door 30 is preferably similar in construction to processor entrance door 20. However, besides prohibiting contamination from entering steam chamber 14, stream chamber entrance door 30 also provides an air seal so that a positive pressure may be created in steam chamber 14 relative to dewatering chamber 12.

Steam chamber 14 includes a steam chamber enclosure 32 which functions to hold steam and a positive pressure therewithin. Conveyor 25 runs through steam chamber 14 from steam chamber entrance door 30 to a steam chamber exit door 38. Within stream chamber 14 a steam delivery pipe 34 delivers steam to a steam distribution pipe 36 which extends along the steam chamber 14. Further details of steam chamber 14 will be discussed below in connection with FIG. 3.

Meat M then passes through steam chamber exit door 38 into cooling chamber 16. Steam chamber exit door 38 is similar in detail to steam chamber entrance door 30. Cooling chamber 16 includes an enclosure 40 that keeps the spray of chilled water within chamber 16 and keeps contaminants away from meat M. Cooling chamber 16 includes left and right chilled water spray banks 42 and 44, respectively. A processor exit door 46 is provided at the output side of chilled water chamber 16. Preferably, processor exit door 46 is similar in construction to processor entrance door 20. Conveyor 25 then carries meat M from processor 10.

Figure 2:
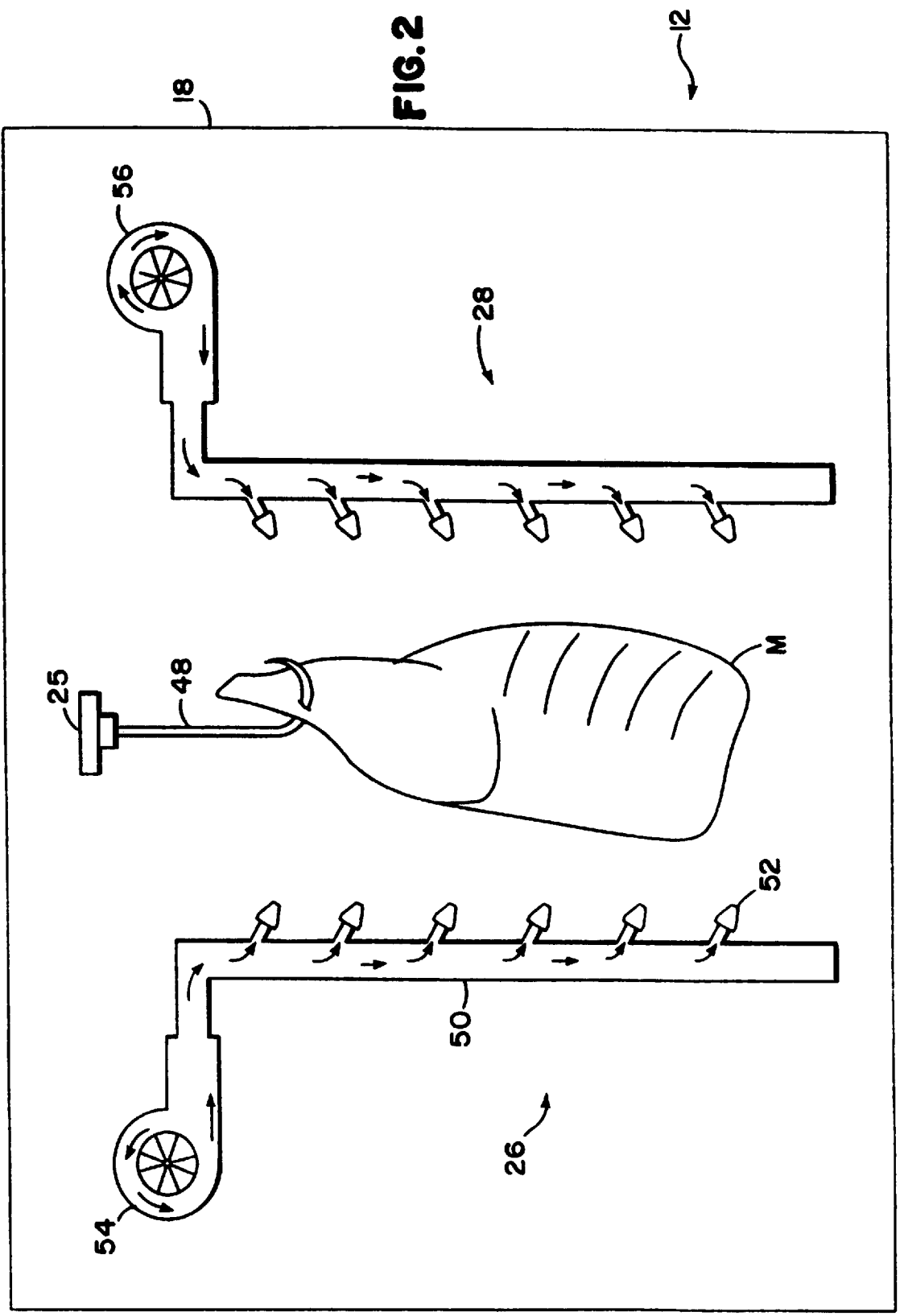
FIG. 2 is a semi-schematic elevational view of the dewatering chamber of the present invention.

As seen in FIG. 2, conveyor 25 also includes a hook 48. Hook 48 is used to secure meat M such that meat M hangs therefrom as it travels through chambers 12, 14, and 16.

The details of dewatering chamber 12 will be discussed. Dewatering chamber 12 includes air manifold pipes 50 with nozzles 52. Manifold pipes 50 and nozzles 52 form left and right air banks 26 and 28. Nozzles 52 shoot air at high velocity at meat M to substantially remove surface water that may reside on the surface or in the crevices of meat M. The high pressure air is provided by left and right blowers 54 and 56. The air travels from the blowers through air pipe 50 and out nozzles 52 against meat M. Air banks are positioned on both sides of meat M so that standing areas or droplets of surface water are substantially removed from the entire surface of meat M before entering steam chamber 14. Removal of substantially all significant amounts of standing surface water is preferred so that, once within steam chamber 14, a significant amount of heat is not absorbed by surface water but instead is transferred directly to the surface of the meat to destroy pathogens. The surface of the meat may still be moist to the touch, but dewatering removes most standing water, whether it be areas of water on the meat surface, or just droplets of water.

Figure 3:
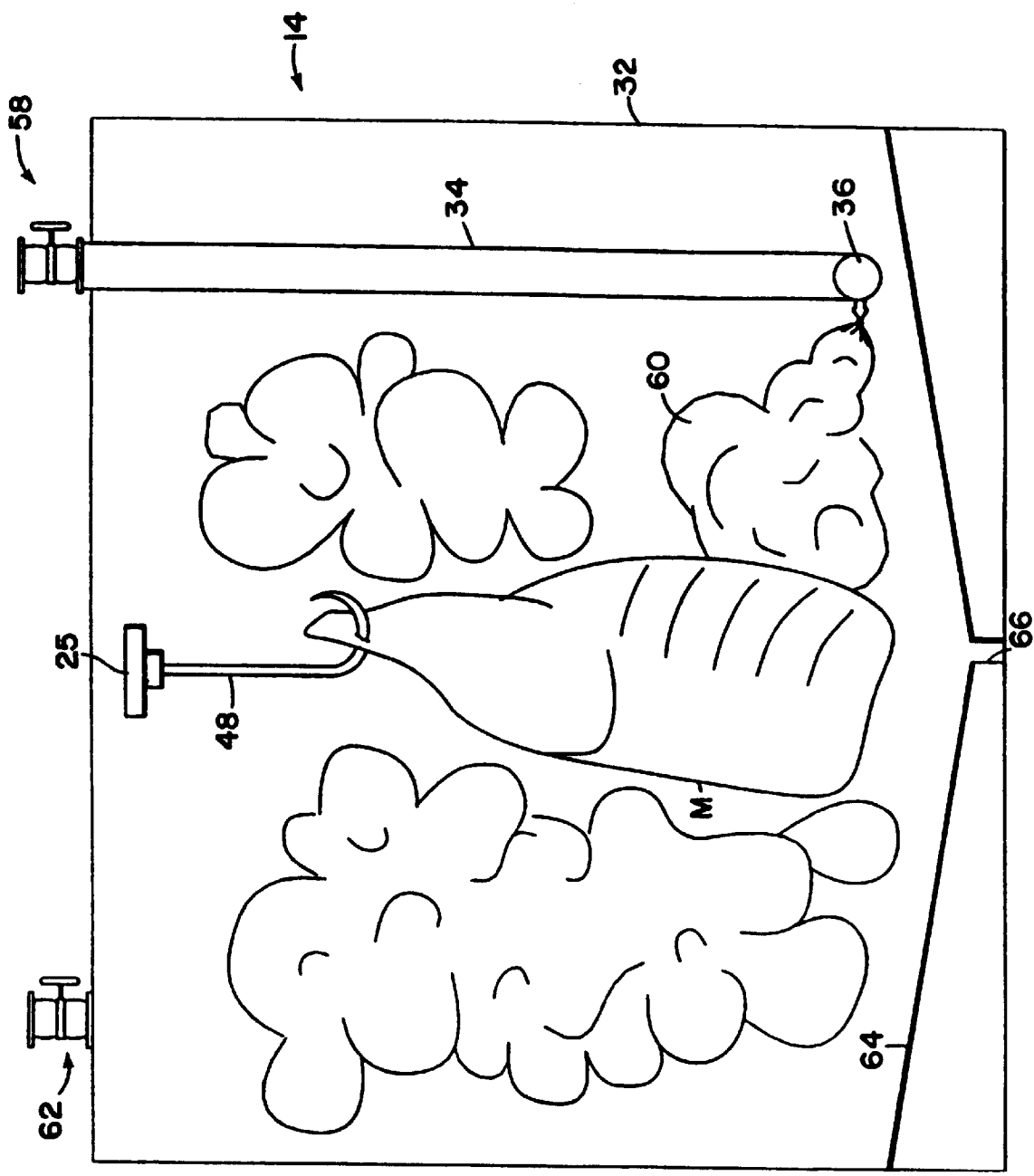
FIG. 3 is a semi-schematic elevational view of the steam chamber.

Referring now to the semi-schematic elevational view of steam heating chamber 14 illustrated in FIG. 3. An entrance valve 58 is provided at the top of steam chamber and closure 32 to deliver steam 60 through delivery pipe 34 and distribution pipe 36. Steam 60 is continually pumped into heating chamber 14 through pipe 36 such that a positive pressure is created within heating chamber 14. The preferred pressure differential is about two inches of water. Other positive pressures could be used, preferably falling anywhere from about one-half to five inches of water relative to dewatering chamber 12 and the cooling chamber 16 as well as the outside environment. However, as little as 0.01 inches of water pressure may be used. A positive pressure within steam chamber 14 helps to ensure that steam 60 very rapidly comes into contact with all surface areas of meat M and air is excluded from steam chamber 14.

As steam 60 contacts and surrounds meat M after it passes through steam chamber entrance door 30, steam 60 heats the surface of meat M. Steam 60 within heating chamber 14 is preferably at 212° F. at saturation. The steam 60 may be superheated to a temperature above 212° F. A pressure relief valve 62 is in communication with the heating chamber enclosure 32 to maintain the desired positive pressure within heating chamber 14.

As steam 60 envelops and contacts the surface of meat M, heat is drawn into the surface of meat M through steam contact. Steam condenses on the surface of meat M. The condensation of steam 60 onto the surface of meat M produces a transfer of heat energy, specifically the change-of-state energy from steam 60, to the surface of meat M. This transfer of energy heats the surface of meat M very quickly and effectively to kill any pathogens residing thereon.

As the condensation continues, water drips to the bottom of steam chamber 14. Steam chamber 14 is provided with a sloped floor 64 and a drain 66 at the bottom thereof to collect this water. Drain 66 is constructed such that pressure does not escape therefrom.

Meat M is preferably kept within steam chamber 14 for approximately 2½ to 30 seconds, 10 seconds being optimal. The surface of meat M is heated one to five microns deep at approximately 160° F.–198° F. during this time. Meat M may also stay within steam chamber 14 a longer amount of time. However, between 2½ to 30 seconds is a preferred amount of time to maintain the surface of meat M between 160 and 198° F. to sufficiently reduce coliform bacteria, salmonella, and other pathogens. The preferred temperature range at the surface of meat M is between 160° F. to 198° F. The time within steam chamber 14 may be set by the speed of conveyor 25 combined with the length of steam chamber 14. The temperature of the meat surface may be extrapolated from temperature measurements taken at various locations, preferably about four, within steam chamber 14.

Figure 4:
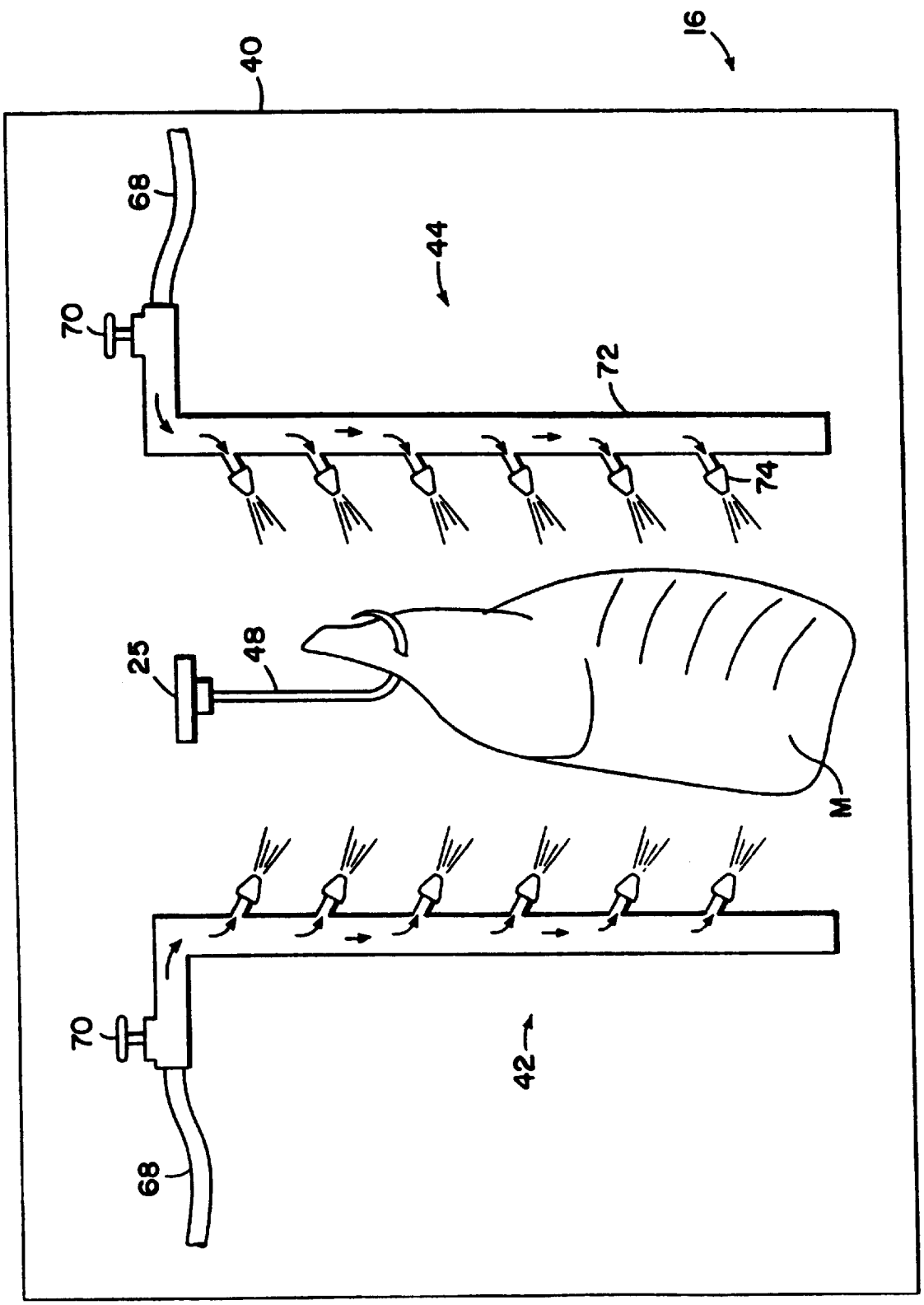
FIG. 4 is a semi-schematic elevational view of the chilled water chamber of the present invention.

Cooling chamber 16 is provided to very rapidly dissipate the heat and thus stop the transfer of heat into meat M. Meat M enters into cooling chamber 16 after it passes through steam chamber exit door 38. See FIG. 4. Once within cooling chamber 16, conveyor 25 transfers meat M between left and right spray banks 42 and 44. Chilled water at preferably about 40° F. is supplied by water supply pipe 68. The water passes through water valve 70 and into water delivery pipes 72. The water is under pressure such that it sprays through water nozzles 74 to contact and thus quickly chill the surface of meat M to remove the heat and provide a final rinse.

Meat M continues along the path of conveyor 25 through processor exit door 46. Meat M exits in a clean state with the surface of meat M effectively pasteurized from any fecal matter and the pathogens that accompany it or other contaminants that may be on the surface of meat M.

In summary, meat M passing through a dewatering chamber to remove excess moisture therefrom prevents surface moisture from absorbing the heat energy from the change of state of the steam in steam chamber 14 to condensation on the surface of meat M. This heat energy effectively destroys the pathogens. Afterwards, the chilled water in cooling chamber 16 rapidly cools the meat so that it is not significantly heated on the surface. This process is clean and effective. It does not employ objectionable chemicals, bacteria, radioactivity, or other expensive processes while ensuring that pathogens such as coliform bacteria, listeria, and salmonella are eliminated from the meat.

Figure 5:
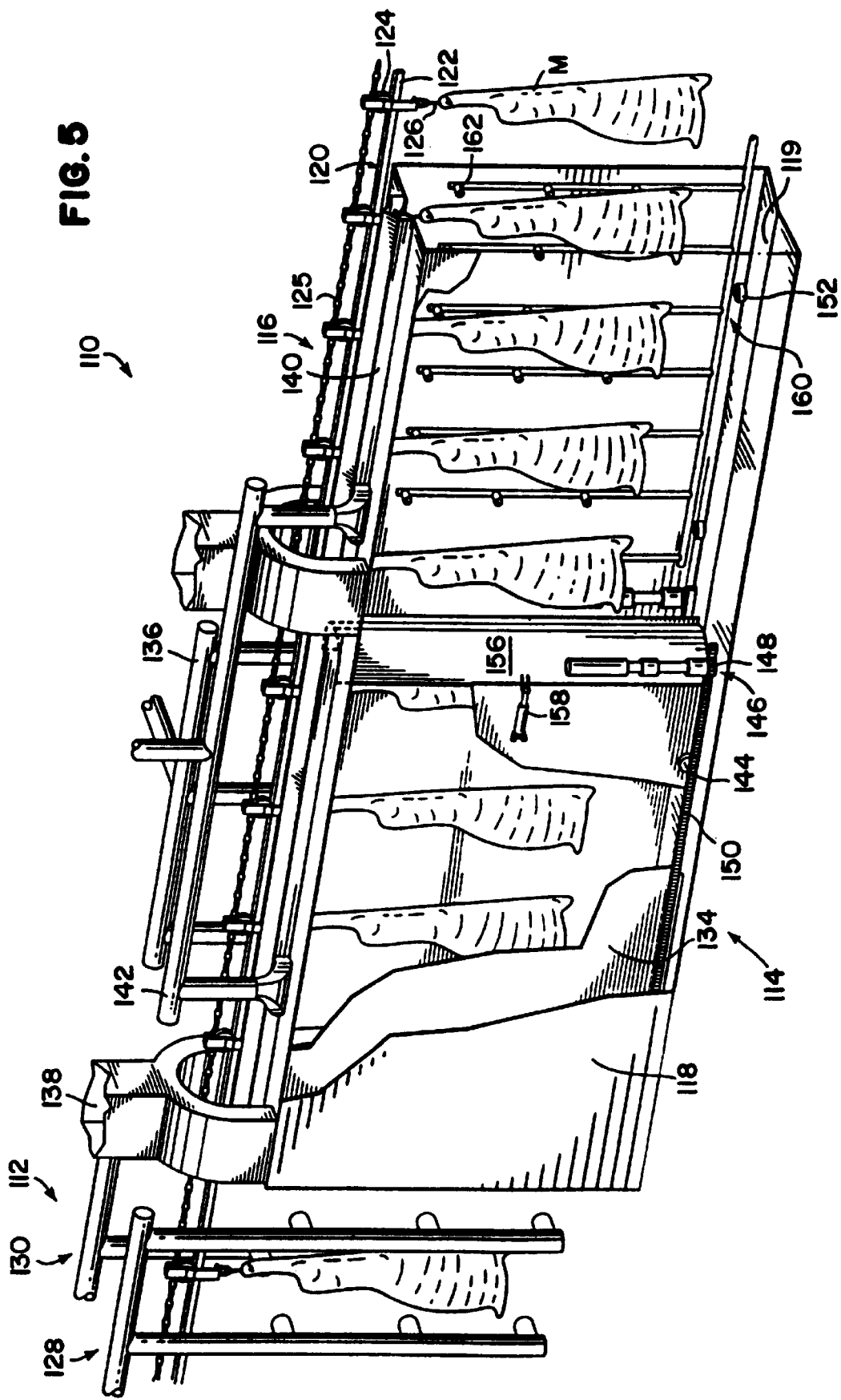
FIG. 5 is an isometric view of another preferred embodiment of the present invention showing meat being moved through a processor.

FIG. 5 illustrates another preferred embodiment of the present invention. In this embodiment, a processor 110 destroys any disease-carrying material on the surface of the meat while the meat M is moving continuously along a conveyor path. It is not necessary to stop the conveyor path but if the conveyor should stop while the meat is in the middle of processor 110, the meat is effectively cleansed and cooled.

Processor 110 includes a dewatering station 112, a steam chamber 114, and a cooling chamber 116. The stream chamber 114 and cooling chamber 116 are both contained within an outer enclosure 118. Outer enclosure 118 is generally parallelepiped in shape and includes an outer enclosure floor 119 that is peaked along the longitudinal center line of the floor. The floor 119 slopes towards the outsides of outer enclosure 118 for collection of condensate runoff from the meat. The cross-sectional size of outer enclosure 118 is somewhat larger than the typical size of a unit of meat M. The length of outer enclosure 118 is approximately 33 feet in the embodiment shown in FIG. 5 that is adapted for use with sides of beef. Of course, the size, including the length, of the enclosure may be varied to accommodate different numbers of sides of beef to be treated at the same time and also for different types of meat, e.g., pork or poultry.

The processor 110 resides primarily below a standard conveyor 120 that is within the processing plant. A conveyor 120 includes a track 122 extending generally horizontally above the center of outer enclosure 118. Rollers 124 ride on top of track 122 and are pulled along by a drive chain 125. Hooks 126 extend below rollers 124 and into outer enclosure 118 as they move through processor 110. The meat M hangs from hooks 126 for processing.

The first stage of processor 110 includes dewatering station 112. Dewatering station 112 includes right air bank 128 and left air bank 130 positioned on the right and left sides of conveyor 120 respectively so as to direct a drying fluid, such as air, at the surfaces of meat M before meat M enters outer enclosure 118. As explained above with reference to the previously described embodiment, it is important to remove excess water from the surface of meat M before it enters steam chamber 114 so that effective heat transfer destroys any bacteria residing on the surface of meat M. Ideally, the drying air is directed at the meat shown in FIGS. 5–8 at a pressure of about 15 psig and at a high volume, i.e., of about 7000 cubic feet per minute. Air banks 128 and 130 may alternatively be arranged in a different fashion. Also, other excess water removal methods may be employed.

Steam chamber 114 ideally extends approximately half of the length of outer enclosure 118. Also ideally steam chamber 114 rides within outer enclosure 118 at all times. Steam chamber 114 includes side walls 134 for enclosing meat M. The steam chamber is illustrated as sized to accommodate four units of meat M (e.g., carcasses) at the same time. A steam supply header 136 is attached to the top of outer enclosure 118 and directs steam into steam chamber 114 as described below with reference to FIG. 9A. A pair of steam ventilation ducts 138 are also provided, attached to the top of outer enclosure 118 on either side of steam supply header 136. Steam ventilation ducts 138 are used to evacuate the steam S from steam chamber 114 as described below in further detail in connection with FIGS. 9A and 9B.

A protection plenum 140 is provided all along the length of outer enclosure 118 immediately below track 122. Protection plenum 140 is a longitudinal enclosure provided with a negative pressure by pulling a vacuum with protection plenum duct 142 in order to keep any steam seepage from contact with the rest of conveyor 120. Preferably, protection plenum duct 142 is connected to at least two locations along trolley protection plenum 140 in order to create negative pressure within the protection plenum and to thus avoid damage to conveyor 120.

Steam chamber 114 also includes support wheels 144 disposed at the bottom of side walls 134. Support wheels 144 support steam chamber 114 above enclosure floor 119 so that steam chamber 114 may move longitudinally within outer enclosure 118.

A chamber drive 146 is attached ideally near the middle of outer enclosure 118 between outer enclosure 118 and steam chamber 114 in order to move steam chamber 114 within outer enclosure 118. Chamber drive 146 preferably includes a servo drive, a brake, a gear motor and a pinion 148. Pinion 148 is positioned at the bottom of chamber drive 146 and along the side of the bottom of steam chamber 114. Racks 150 are provided all along the bottom of side walls 134 of steam chamber 114. Thus, steam chamber 114 may be moved within outer enclosure 118 by rack 150 being driven by pinion 148 of chamber drive 146.

Horizontally disposed guide wheels 152 are also provided to engage the outer surface of rack 150 in order to prevent yaw of steam chamber 114 while it is being moved within outer enclosure 118. Guide wheels 152 are rotatably journeyed on stationary brackets to the inside of outer enclosure 118. Chamber drive 146 is switched on when steam chamber 114 is filled with a desired number of units of meat M and moves steam chamber 114 at substantially the same rate of speed as conveyor 120, such that it moves along with meat M for a set period of time to apply steam S to meat M. Chamber drive 146 then quickly retracts steam chamber 114 to its start position as explained below.

Entrance doors 154 (not shown in FIG. 5) and exit doors 156 are provided on the ends of steam chamber 114 in order to seal the chamber for application of steam S. Door actuators 158 are mounted to side walls 134 of the steam chamber 114 in order to open and close entrance and exit doors 154 and 156.

The downstream end of outer enclosure 118 contains chilled fluid banks 160. Chilled fluid banks 160 include pipes which channel a cooling fluid, preferably water, to coolant nozzles 162. Coolant nozzles 162 are directed to meat M to spray a coolant fluid on the surface of meat M in order to quickly reduce the surface temperature of meat M after steam chamber 114 is retracted from meat M. Once meat M passes between chilled fluid banks 160 harmful surface bacteria has been destroyed and meat M is ready to move on to additional processing steps and shipment to retailers and consumers.

FIGS. 6, 7 and 8 illustrate the movement of steam chamber 114 within outer enclosure 118 while meat M is processed with processor 110. Meat M is supported by and moves along conveyor 120 during the entire process. Ideally the conveyor is moving at a substantially constant speed, but occasionally the conveyor speed may change, or the conveyor may even stop. Nonetheless, the present invention is capable of accommodating this change in conveyor speed.

As meat M enters into outer enclosure 118 it moves through entrance doors 154 into steam chamber 114. The distance between side walls 134 of steam chamber 114 is sufficient to enclose meat M therein. The length of steam chamber 114 is preferably long enough to enclose a desired number of units of meat M. Although four units are shown enclosed in FIGS. 6, 7 and 8, the length of the steam chamber 114 may be designed to accommodate a different number of units and also various types of meat.

Once four units of meat M enter into steam chamber 114, entrance door 154 and exit door 156 are closed by actuators 158. As soon as this occurs, steam chamber 114 begins to move along with meat M at the same rate as the movement of meat M while filling with steam (about 7.1 inches per second). Steam surrounds meat M preferably at a temperature of about 212° F. at sea level for a preferred length of time of 10 seconds. The temperature may be anywhere within the range of about 175° F.–500° F. and preferably surrounds the entire surface of meat M for a period of time between about 5 seconds and 30 seconds. The pressure within the chamber may be positive relative to ambient pressure to maintain steam purity. Temperature measurements are preferably taken at about four locations within steam chamber 114 and used to determine the temperature of the atmosphere within the steam chamber during the present process. Steam chamber 114 is moved within outer enclosure 118 by chamber drives 146 acting on rack 150. Guide wheels 152 stabilize the movement of steam chamber 114 as it moves with meat M.

As seen in FIG. 7, once the desired time for application of steam to the surface of meat M has been met, entrance and exit doors 154 and 156 are opened and steam chamber 114 is quickly retracted back (preferably at about 12 feet per second) to the upstream end of outer enclosure 118 to enclose additional meat M to begin the process over again. Meanwhile, as shown in FIG. 6, meat M that has been treated, continues to move through outer enclosure 118 within cooling chamber 116. Chilled fluid banks 160 spray coolant on the outer surfaces of meat M to rapidly decrease the surface temperature of meat M. This coolant prevents meat M from being cooked at its surface. The coolant W directed at meat M through nozzles 162 may be any coolant fluid such as air, water, or water, perhaps with an antimicrobial agent mixed therein. Specific antimicrobial agents that may be used include lactic acid, trisodium phosphate, acetic acid, and chlorine dioxide.

Should conveyor 120 stop, steam chamber 114 will also be stopped by a switch that is triggered by movement or nonmovement of conveyor 120. Steam continues to be applied to meat M for the desired period of time after which doors 154 and 156 are opened and air is rushed through steam chamber 114 to evacuate steam S and to provide a cooling effect on meat M. Also, simultaneously the flow of chilled fluid may be started, which would assist in rapidly cooling the meat even though the fluid may not be actually spraying the surface of the meat. Thus, processor 110 can process meat with the continually moving line or with inadvertent stops in the line as meat M moves through processor 110. As such, the remaining processes within the plant that may cause conveyor 120 to stop can go on without worry of processor 110 and meat M being adversely affected.

Figure 9A:
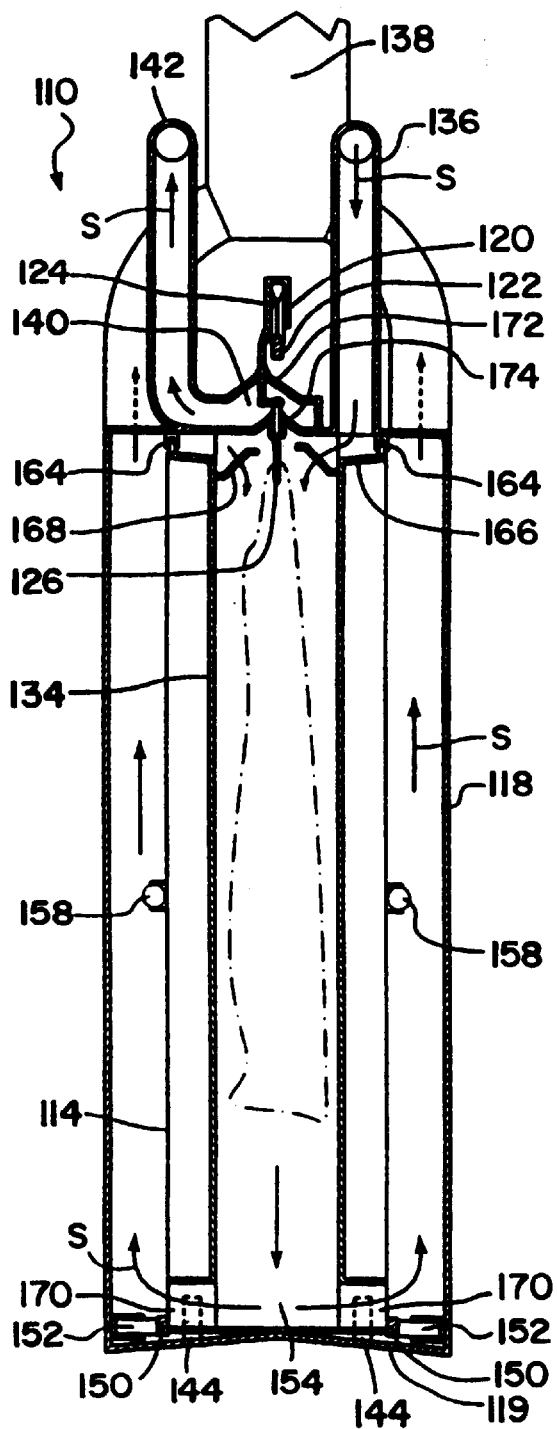
FIG. 9A is a cross-sectional end view showing the circulation of steam through the steam chamber.

FIGS. 9A and B illustrate the movement of steam S through steam chamber 114.

FIG. 9A illustrates the steam supply cycle as steam surrounds meat M and simultaneously pushes out any air surrounding meat M. Steam enters through steam supply header 136 through the top of outer enclosure 118. Chamber seals 164 provide a sealing engagement between the top of steam chamber 114 and outer enclosure 118. Steam supply header enters within the inside of chamber seals 164 such that the steam is channeled within side walls 134 of steam chamber 114. First and second deflection plates 166 and 168, respectively, are provided along the top of side walls 134 of steam chamber 114. First deflection plate 166 is nearest to steam supply header 136 and channels steam, as explained below in connection with FIG. 10. Steam then surrounds and moves down along the top and sides of meat M while simultaneously pushing air out the bottom of steam chamber 114 through gas escape openings 170. Gas escape openings 170 are provided along the bottom of steam chamber 114 to allow air and steam to be pulled out of the bottom of steam chamber 114 up and through steam ventilation duct 138. As steam S is pumped into steam chamber 114 the heavier air moves toward the bottom and is pulled out of steam chamber 114 along the sides of steam chamber 114 within outer enclosure 118. Thus, steam uniformly covers the surface of meat M without any substantial air pockets. This ensures that adequate heat transfer takes place at the surface of meat M without any insulating effect of air. The volume of steam supplied to the steam chamber 114 to purge the chamber and treat the meat M is ideally about three to four times the volume of the steam chamber. However, depending on the temperature and pressure of the steam and other factors, more or less steam may be supplied to the steam chamber.

Figure 9B:
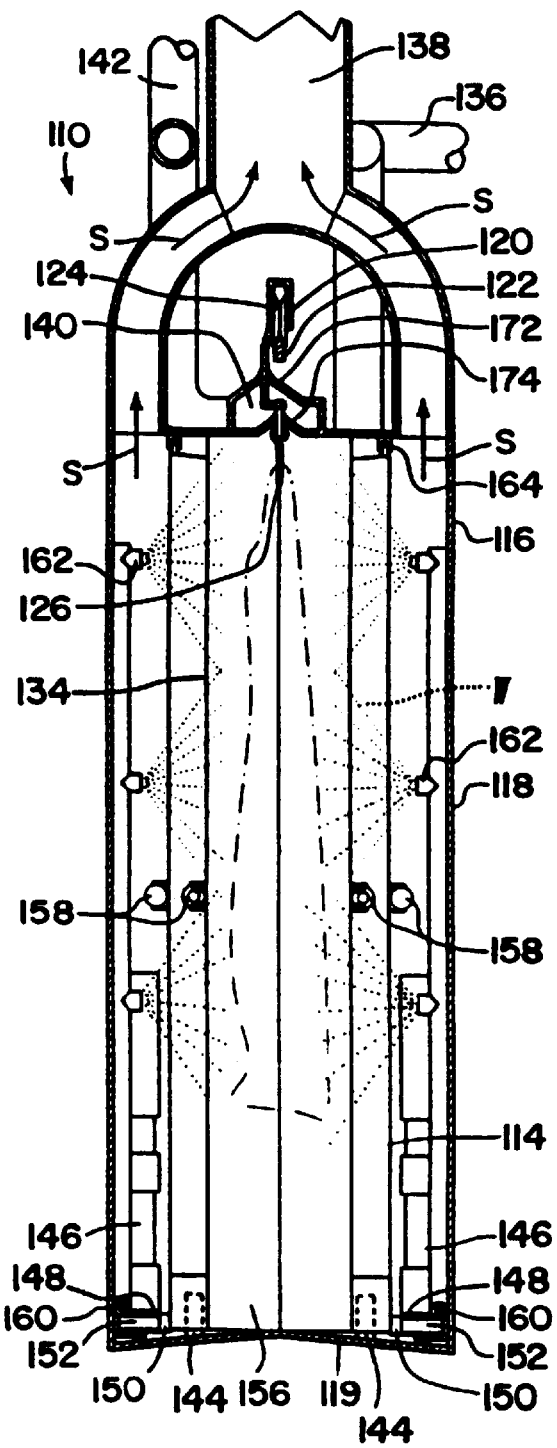
FIG. 9B is a cross-sectional end view showing the coolant water being sprayed on a carcass after the steam chamber has been retracted.

FIG. 9B illustrates the cooling of meat M after steam is evacuated from steam chamber 114 and steam chamber 114 is retracted from meat M which is now advanced to the downstream end of outer enclosure 118.

Figure 10:
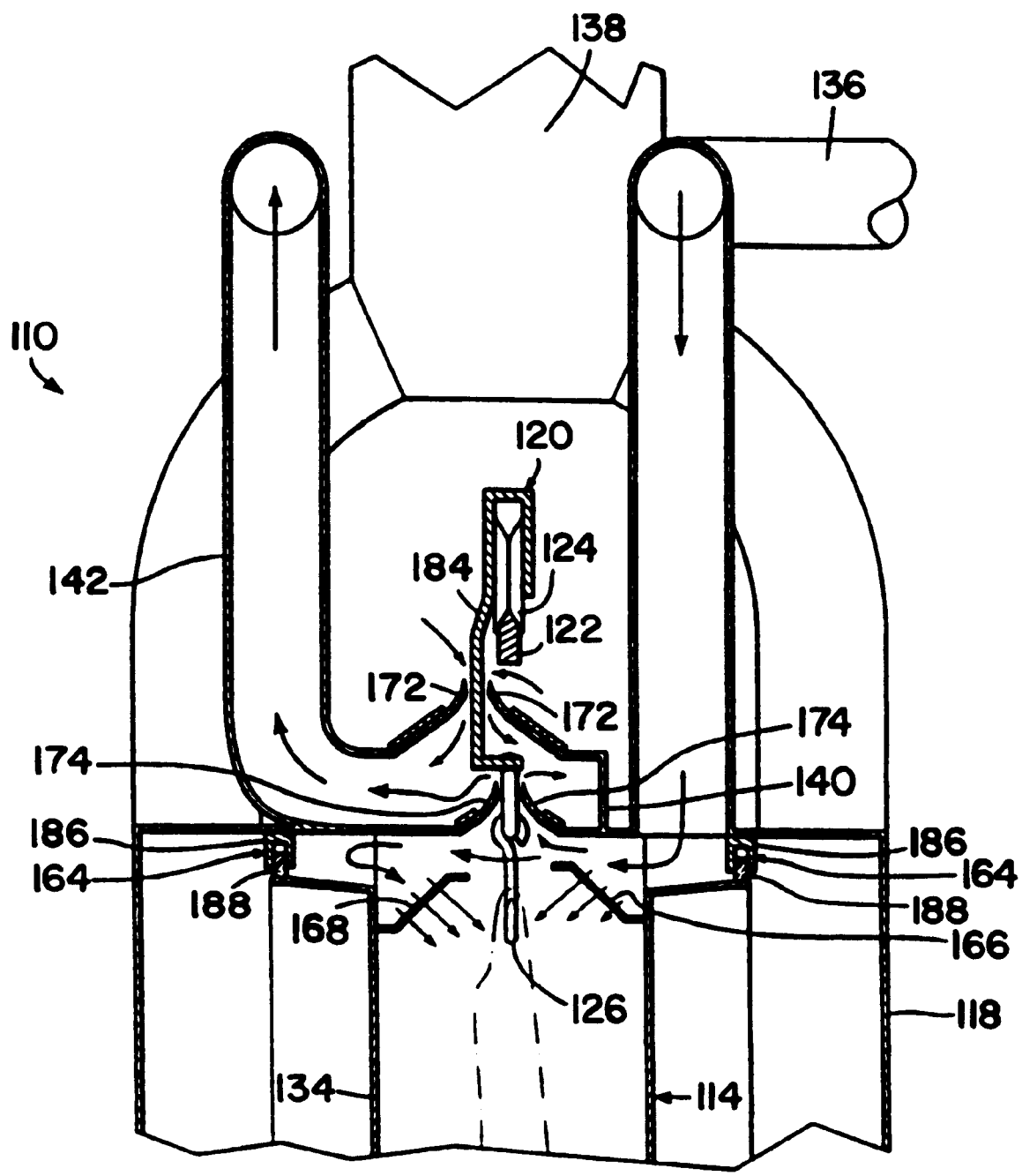
FIG. 10 is a sectional view showing the functioning of the protection plenum ventilation system.

FIG. 10 illustrates in further detail the flow of steam into steam chamber 114, as well as the functioning of protection plenum 140. As steam moves from steam header 136 it is channeled toward meat M with first deflection plate 166. First deflection plate 166 is approximately 40% open with holes formed therein, such that it allows some steam to enter directly to the top of meat M to fill steam chamber 114, while channeling additional steam to the opposite side of meat M to be directed down through second deflection plate 168 which is approximately 60% open. Thus, steam substantially evenly moves down all sides of meat M. Other ratios of openness of deflection plates 166 and 168 may be used depending on the pressure and volume of steam supplied, such that steam moves evenly over the surface of meat M to push air out the bottom of steam chamber 114 so that no pockets of air remain on the surface of meat M.

Also illustrated in further detail are chamber seals 164. Chamber seals 164 include an upper member 186 which is an inverted U-shape and a lower member 188 projecting upwardly from the top of outer wall 132 to meet within upper member 186. Upper members 186 effectively forms a channel beneath the top side of outer enclosure 118. Thus, little or no steam escapes through chamber seal 164.

Protection plenum 140 provides a channel for capturing escaped steam along the top of outer enclosure 118 beneath track 122. Steam is pulled out of protection plenum 140 with plenum ventilation duct 142 such that a negative pressure is maintained within protection plenum 140, relative to the interior of steam chamber 114 and to the ambient air. An upper plenum wiper seal 172 constructed of two strips of flexible rubber or similar material, that are angled upwardly and inwardly toward each, is provided at the top of protection plenum 140 to allow a nominally closed slot through which a conveyor brackets 184 may slide. When a conveyor bracket 184 is not between upper plenum seal 172, the two strips contact against each other to block steam from exiting the plenum. While brackets 184 pass along seal 172 some small openings may occur. However, since a negative pressure relative to the outside environment is maintained, air will be pulled into protection plenum 140 to be evacuated with steam S through plenum ventilation duct 142. Likewise, a lower plenum seal 174 is provided just above hook 126 to seal the lower side of protection plenum 140 and to evacuate any steam that may escape from outer enclosure 118 and from steam chamber 114. Lower plenum seal 174 also includes two rubber strips (or similar material) that are angled upwardly to meet at their uppermost ends and to provide a normally closed slot through which bracket 184 may slide.

FIGS. 11A and B illustrate the details of exit door 156 (FIG. 11B) and entrance door 154 (FIG. 11A). Exit door 156 includes door arms (halves) 176 that are pivotally attached to side walls 134 for sealing closure therewith. Actuator brackets 178 are secured to the outsides of side walls 134 and include a pivotal attachment to door actuators 158. The opposite end of door actuators 158 are secured to door brackets 180. Thus, retraction of actuator 158 causes door 156 to open while extension of actuators 158 causes door 156 to close. Door 156 includes door arms 176, each attached to a door bracket 180. The free ends of door arms 176 include hook-shaped door seals 182 that may be compressed one to another to provide an effective seal in the middle of door 156. The curved shape of door arms 176, with their connection to actuators 158, allows doors 156 to be opened and closed with minimal movement and space requirements outwardly from inner walls 134. Also, door 156 will open automatically when pushed by meat M.

Entrance doors 154 are somewhat similarly constructed. However, entrance doors 154 include actuators 158 attached to brackets fixed to outwardly extended portions of side walls 134. Side walls 134 flare outwardly near the upstream end of chamber 114 after which they extend in approximately parallel planes to the upstream end of chamber 114. This wider region of side walls 134 is necessary to accommodate the opening of door 154 inside of side walls 134. The pivot point of door arms 176 are at the upstream end of side walls 134. Supports 184 are provided to serve as a pivot for bracket 180 of door arms 176.

Another preferred alternate embodiment of the invention is provided and will be described in connection with FIG. 12. In this embodiment removal of excess surface liquid from the meat M, the application of steam to the meat, and cooling, is all carried out within moveable chamber 214. Except for the elements described below, the aspects of this embodiment are similar to those described above with respect to FIGS. 5–11. For example, an outer enclosure 218, similar to enclosure 118 is provided along with a conveyor 220 and track 222. A protection plenum 240, similar to protection plenum 140 is also provided as well as a plenum duct 242, a steam supply header 236 and a steam ventilation duct 238.

Figure 12:
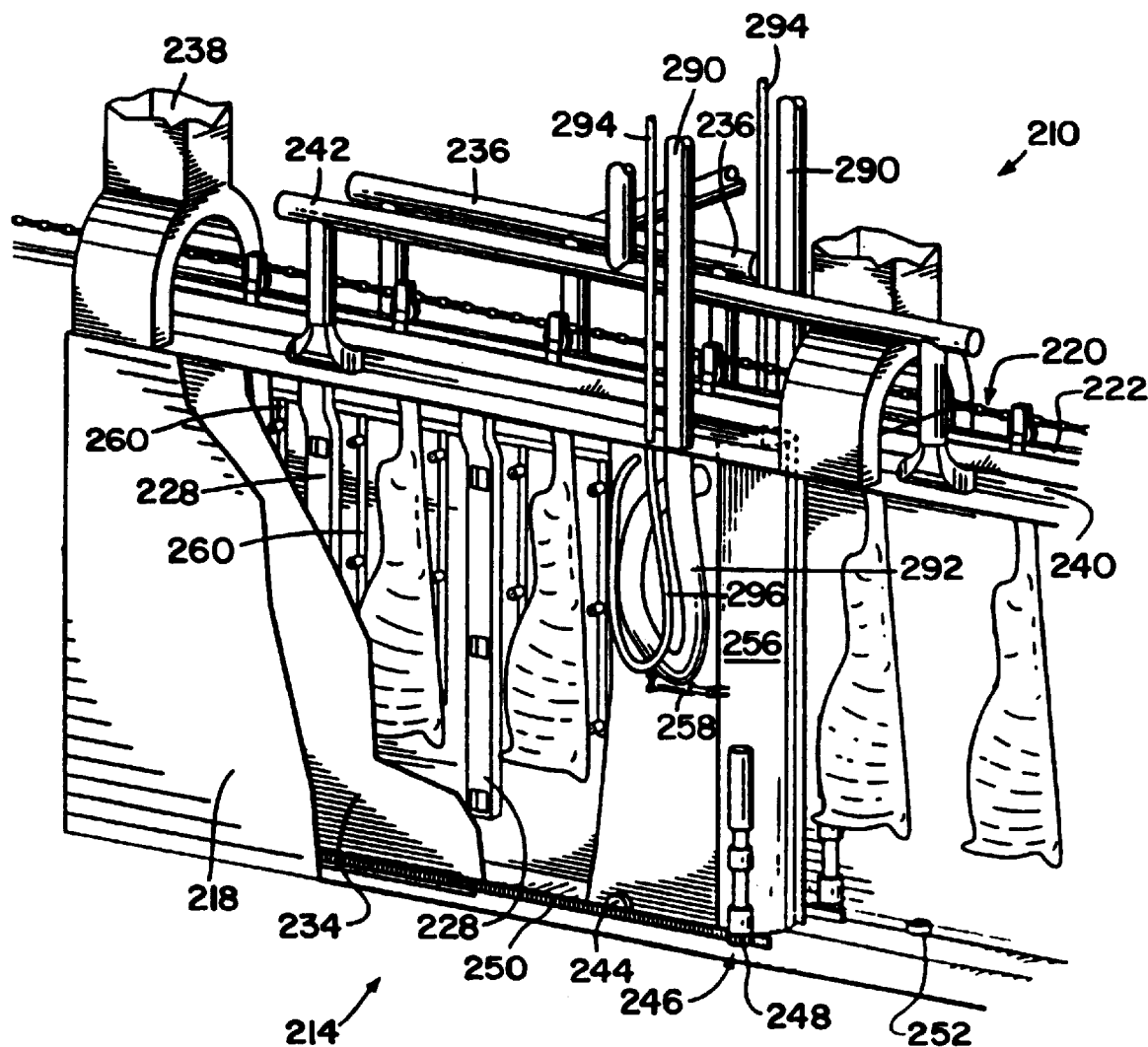
FIG. 12 is an isometric view of an alternate preferred processor including dewatering, steaming, and cooling structures with a moving chamber.

However, in the embodiment of the present invention show in FIG. 12, in order to carry out all steps within chamber 214, air banks 228 and chilled water banks 260 are secured to the inside of side walls 234 of chamber 214. Air banks 228 are illustrated as extending in columns down both of the insides of side walls 234. Air banks 228 include openings for blowing a coolant fluid, such as air, at the surface of meat M to remove excess surface liquid. The excess liquid is removed before steam is applied to the surface of meat M within chamber 214 as meat M moves along conveyor 220. Air banks 228 are connected to air supply lines 290 which extend to within the top of enclosure 218. Air supply lines 290 are coupled to flexible air hoses 292 that extend within chamber 214 to be connected to air banks 228. Flexible air hoses 292 are used with extra length to enable movement of chamber 214, while maintaining a constant connection with fixed air supply lines 290. The fluid for removing excess liquid from meat M may be obtained from fluid supply tanks or simply from ambient air.

Similarly, chilled water banks 260 are connected to flexible coolant hoses 296 that run to coolant supply lines 294. Again, the flexibility of flexible coolant hoses 296 allow chamber 214 to move relative to coolant supply lines 294 while still maintaining a constant supply of coolant fluid for cooling meat M within chamber 214 as meat M moves along conveyor 220.

The process of this alternate embodiment begins with meat M entering into entrance door 254 (not shown). Meat M continues to move as four or other number units (or carcasses) of meat M are enclosed within chamber 214. During this time air banks 228 blow air at the surfaces of meat M to remove any significant amounts of standing liquid, such as water, from the surfaces. Once doors 254 and 256 are closed, and the meat surfaces are sufficiently free from standing water, steam supply header 236 fills chamber 214 with steam for a sufficient amount of time and at such a temperature and pressure to destroy any surface pathogens, as described above in connection with previous embodiments. During this time, chamber 214 continues to move along with meat M on conveyor 220. Steam is then evacuated from chamber 214 with steam ventilation ducts 238 and chilled water banks 260 spray the surface of meat M to cool meat M and prevent any cooking of the meat. Chamber 214 is then retracted to enclose additional meat to repeat the same process.

Figure 13:
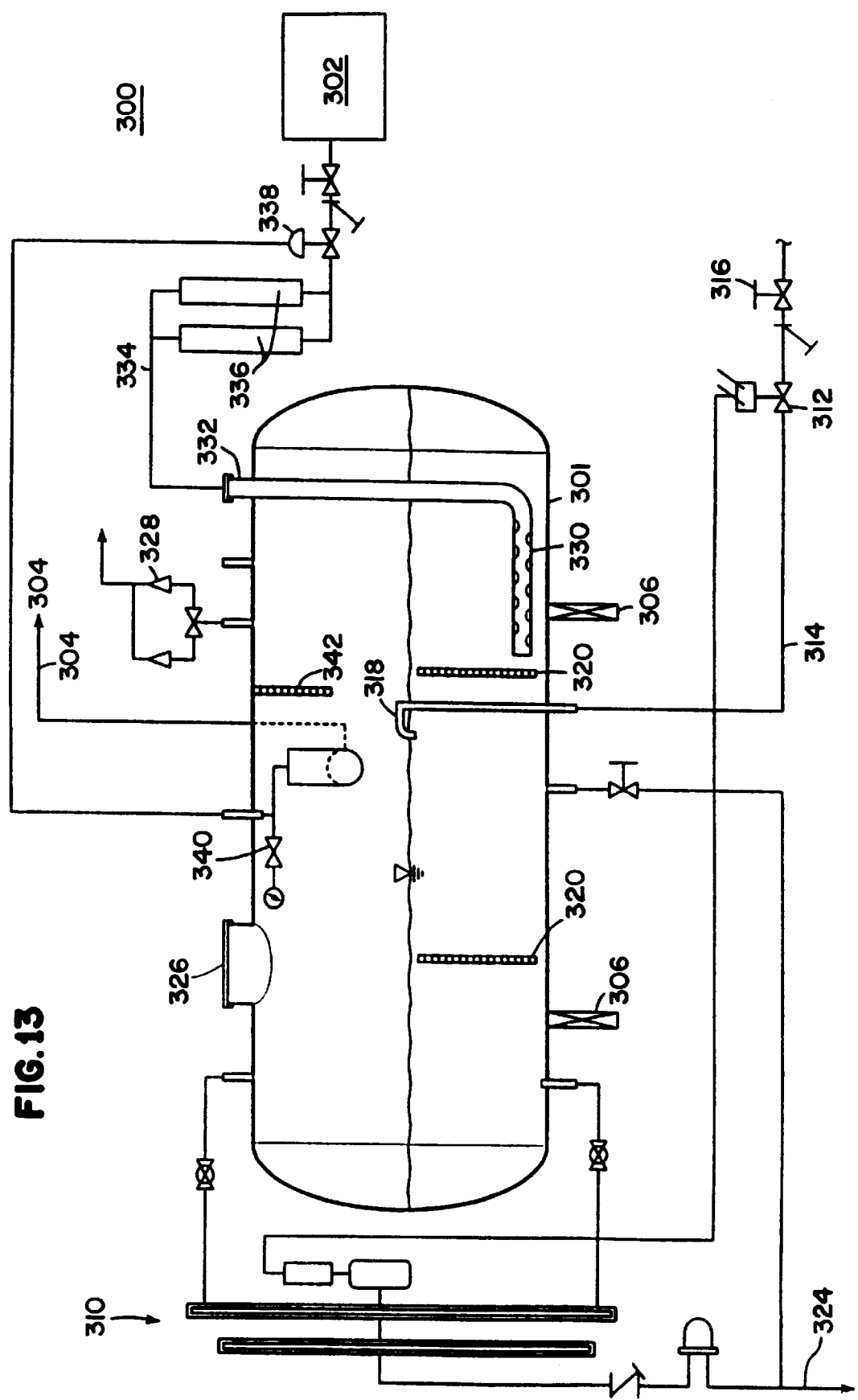
FIG. 13 is a schematic view of a system for generating and supplying steam to the steam chambers of the present invention.

FIG. 13 illustrates applicants' unique system 300 for supplying steam to the steam chambers 14, 114 and 214 in sufficient quality and volume to very quickly purge and fill the steam chambers so that the meat M may be effectively and efficiently treated with the steam to destroy pathogens on the meat. To this end, the steam supply system 300 of the present invention includes a horizontally, elongate steam generation and storage vessel or tank 301 receiving steam from a boiler 302 or other steam source and supplying relatively large volumes of relatively low pressure steam to the steam chambers 14, 114 and 214 through outlet line 304.

To discuss the construction and operation of the steam supply system 300 in more detail, the vessel 301 is supported by spaced apart legs 306 in a standard manner. The vessel 301 is approximately half filled with water as indicated by 308. The water is at a temperature of approximately from 110° Celsius to about 130° Celsius. The level of the water 308 in tank 300 is maintained by a water level control system 310 capable of sensing the water level in the tank and controlling valve 312 operably disposed in water supply line 314. Ideally, a manual shutoff valve 316 is also disposed in water supply line 314 upstream of valve 312. The makeup water is introduced into vessel 301 through an inlet 318 located at an elevation somewhat below the top of the water line. A pair of transverse baffles 320 are mounted within the interior of the vessel 301 to restrict the shifting of the water 308 longitudinally within the vessel 301 during, for instance, introduction of supply steam into the tank, as discussed more fully below. In a preferred embodiment of the present invention, the baffles are approximately 50% open.

The vessel 301 is fitted with an outlet valve 322 connected in fluid flow communication to the drain 324. The valve 322 may be used to flush the vessel 301. Also, an inspection manway 326 is built into the top of the tank 301 to allow personnel entrance into the interior of the tank.

The vessel further includes a relief valve system 328 to relieve the pressure of the steam within the vessel if necessary. During operation, the steam produced by the supply system of the present invention exits the vessel 301 at about 21 psia to about 40 psia. Of course, the pressure of the steam exiting the vessel may have to be altered depending on various factors, including the pressure drop experienced in the steam between vessel 301 and the steam chambers 14, 114 and 214, as well as the desired volumetric flow rate of the steam supplied at the steam chambers. In one embodiment, vessel 301 ideally is constructed from stainless steel at an ASME/CSA rating of 60 pounds/300 cubic feet steam service. The relief valve system 328 is used to make sure that the pressure of the steam within the vessel 301 does not exceed safe limits.

Saturated dry steam at from approximately 60 to 100 psia and at about from 144 to 164 degrees Celsius is supplied to vessel 301 through an inlet pipe 330 having an exterior nipple 332 connected to supply line 334 receiving this charging steam from a boiler 302 or other type of steam supply. Filters 336 are interposed in supply line 334 to filter out impurities therein. The pressure of the steam within the supply line 334 is controlled by a pressure control valve 338.

It is to be appreciated that the water in vessel 301 may be heated other than by use of charging steam. For instance, the water could be heated directly by an electrically or gas fueled heater or by steam heating coils.

Steam from vessel 301 is directed to the steam chambers 14, 114 and 214 through an outlet line 304 located at an upper central portion of the vessel. A monitoring system 340 monitors the temperature and pressure of the steam exiting the vessel 301 through line 304, which monitoring system is operably connected to valve 338 in the steam supply line 334. A steam baffle 342 is transversely located in the upper elevator of the vessel 301 to enhance the mixing of the steam within the vessel.

It will be appreciated that in the steam supply system of the present invention, the water 308 stored within the vessel 301 serves as a heat energy reservoir capable of being utilized to very rapidly generate relatively large volumes of steam. This is important in that to flush the steam treatment chambers 14, 114 and 214, steam at a volume of approximately three to four times the volume of the steam chambers is required to be introduced into the steam chambers very rapidly. Essentially, large charges of steam are instantaneously required by the steam treatment chambers 14, 114 and 214. The steam supply system of the present invention is capable of supplying such relatively large volumes of steam. To this end, ideally the volume of water in vessel 301 is about from $\frac{1}{10}$ to $\frac{1}{5}$ of the volume of the steam treatment chambers. Also, ideally the water in the vessel 301 occupies about from $\frac{1}{3}$ to $\frac{2}{3}$ of the volume of the vessel.

It will be appreciated that if steam were supplied to the steam treatment chambers 14, 114 and 214 from a storage vessel of pure steam, such storage vessel would have to be significantly larger in size than vessel 301 to be able to supply the steam at a rate fast enough to purge the steam treatment chambers and fill the chambers with treatment steam at a pace required by the present invention. If the steam were pressurized in an attempt to reduce the volume of such steam storage vessel, it is possible that the pressurized steam could cause hot spots and other damage to the meat being treated within the treatment chambers 14, 114 and 214. However, through the present invention, applicants are able to supply large volumes of relatively low pressure steam to the steam treatment chambers 14, 114 and 214.

Modification of the Apparatus and Method

Although the apparatus may be referred to as a contamination-reducing apparatus, it will be understood that the apparatus is provided to reduce the occurrence of any surface contamination on meat. Many pieces of do not have any surface contamination. It has been found that the movement of the steam chamber 114 often results in breakdowns of the apparatus of FIGS. 5–8. The apparatus 110 may be modified to operate without movement of the steam chamber 114. The conveyor 120 is operated so that the conveyor 120 is stopped when meat M is brought into the steam chamber 114. The meat is then steam pasteurized and the conveyor 120 is subsequently restarted to convey the meat to the cooling chamber 116, typically bringing new meat into the steam chamber 114.

Figure 14:
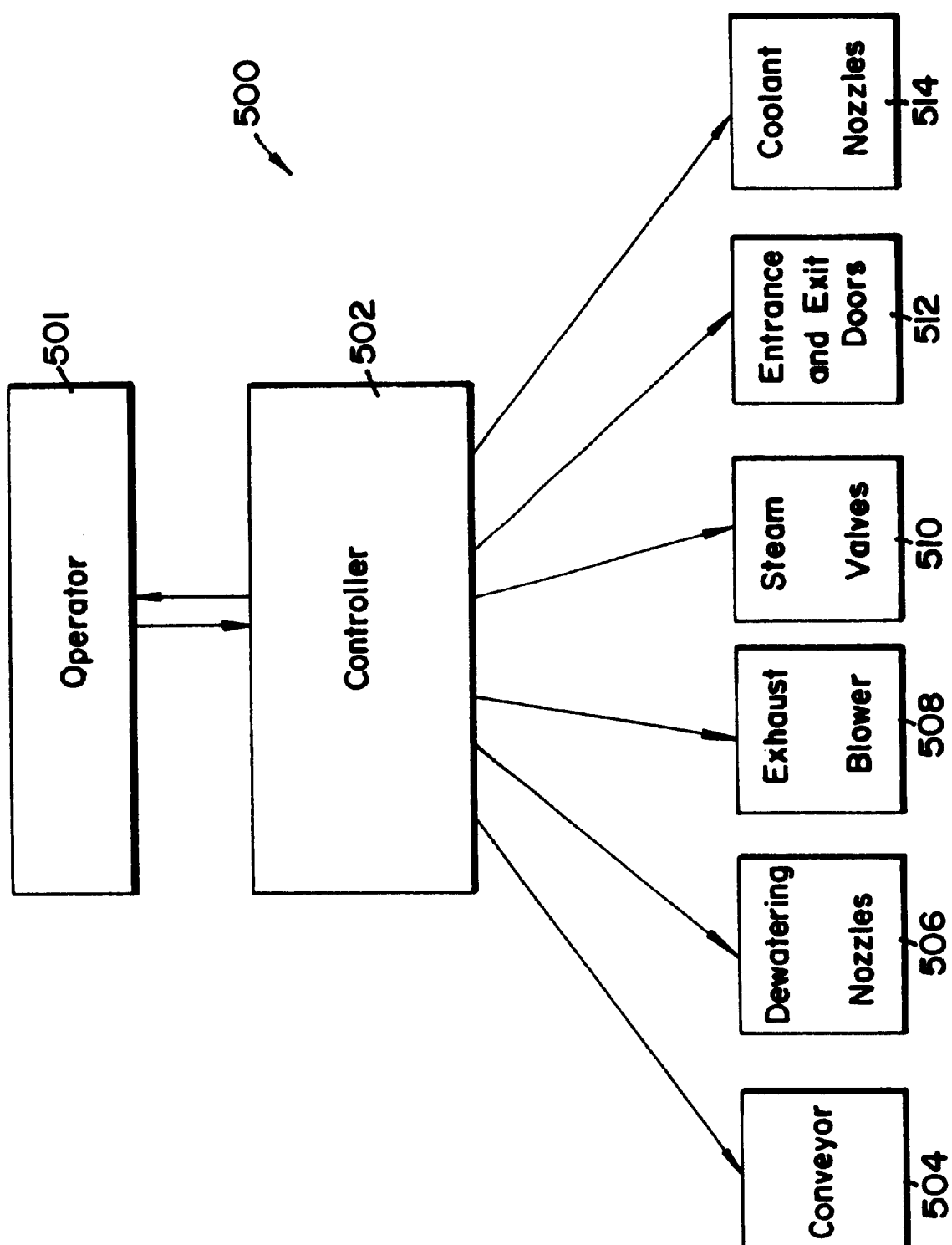
FIG. 14 is a schematic representation of a controller for use with an apparatus of the present invention.

FIG. 14 illustrates, in block diagram form, a schematic of a control system 500 for operating the apparatus 110, illustrated in FIGS. 5–8. An operator 501 provides input to a controller 502, such as a computer or other device, that sends signals to operate one or more components of the apparatus 110. The controller 502 may, for example, provide operation information to the operator 501, start and stop the conveyor 504 (e.g., the conveyor 120 of FIG. 5), open and close the dewatering nozzles 506 (e.g., nozzles on the air banks 128, 130 of FIG. 5) in the dewatering chamber, start and stop an exhaust blower 508 associated with steam ventilation ducts (e.g., the ducts 138 of FIG. 5), open and close the steam entrance valves 510 connected to the steam supply header (e.g., the steam supply header 136 of FIG. 5), open and close the entrance and/or exit doors 512 (e.g., the doors 154, 156 of FIGS. 5–8), and/or open and close the coolant nozzles 514 (e.g., the nozzles 162 of FIG. 5) in the coolant chamber.

The controller 502 typically contains programmable or other circuitry for performing one or more of these functions. The controller 502 may include, for example, microprocessor(s), microcomputer(s), firmware, hard-wired circuitry, and/or other programmable devices. For example, the controller 502 may include a computer that has software and/or hardware that performs for the controller functions. In some embodiments, the controller 502 may include one or more subcontrollers (not shown) that each provide one or more of the controller functions. Alternatively, the apparatus may include two or more controllers that each independently and, in some cases, redundantly provide for one or more of the controller functions. In some instances, one or more of the functions described above may not be provided by a controller. For example, the exhaust blower may be turned on and off manually. In addition, in some embodiments, a single start switch is coupled to the controller 502 to activate two or more, and, in some instances, all of the components of the apparatus.

Referring to the apparatus 110 illustrated in FIGS. 5–8 and the control system 500 illustrated in FIG. 14, in one method of operation, the controller 502 directs the conveyor 120 to move a first group of one or more pieces of meat into a dewatering region (e.g., the dewatering station 112 of FIG. 5) to be dewatered using a dewatering fluid (e.g., high pressure gas, such as air) from the right and left air banks 128, 130. A previous group of meat may be in a steam region (e.g., the steam chamber 114 of FIG. 5) for steam pasteurization. The controller directs the conveyor 120 to stop the movement of the meat during the steam pasteurization of this previous group of meat. After pasteurization, the controller 502 opens the entrance door 154 and restarts the conveyor 120 to move the first group of meat into the steam region. The controller 502 may simultaneously open the exit door 156, especially if a previous group of meat is in the steam region.

After moving the first group of meat into the steam region, the controller 502 directs the conveyor 120 to stop the movement of the meat and closes the entrance and exit doors 154, 156, leaving the first group of meat in the steam region. A second group of meat may be provided at the dewatering region. The controller 502 may open the steam ventilation ducts 138 (if they were closed) and/or start an exhaust blower (not shown) coupled to the ducts 138. The controller 502 then opens one or more steam valves attached to the steam supply header 136. The steam from the steam entrance valves proceeds to come in contact with the surface of the meat to heat the meat to the temperatures described above.

After the surface of the meat has been heated, the controller 502 opens the exit door 156 and directs the conveyor 120 to move the first group of meat to the coolant region (e.g., the coolant chamber 116 of FIG. 5). The entrance door 154 may also be opened to allow the second group of meat into the steam region. The coolant nozzles 162 in the coolant region are operated to spray coolant fluid (e.g., water or air) on the first group of meat.

Typically, the controller 502 starts the conveyor 120 to move a first group of meat into the dewatering region, a second group of meat from the dewatering region into the steam region, a third group of meat from the steam region into the coolant region, and a fourth group of meat out of the coolant region. The controller then directs the conveyor 120 to stop the movement of the meat when the meat is in the steam region so that the meat can be steam pasteurized. The controller 502 then directs the conveyor 120 to restart the movement of each group of meat to the next station. The controller 502 typically operates automatically, but the controller 502 may be configured to require manual control of one or more (and, in some instances, all) of the controller functions or to allow manual override. The advantages of these modifications to apparatus 110 include that the steam chamber 114 is not moved so that there is no concern about breakdowns associated with the movement mechanisms of the chamber 114. In many instances, the conveyor 120 is more reliable and is often designed for stopping and starting movement of the meat and easy control.

Figure 15A:
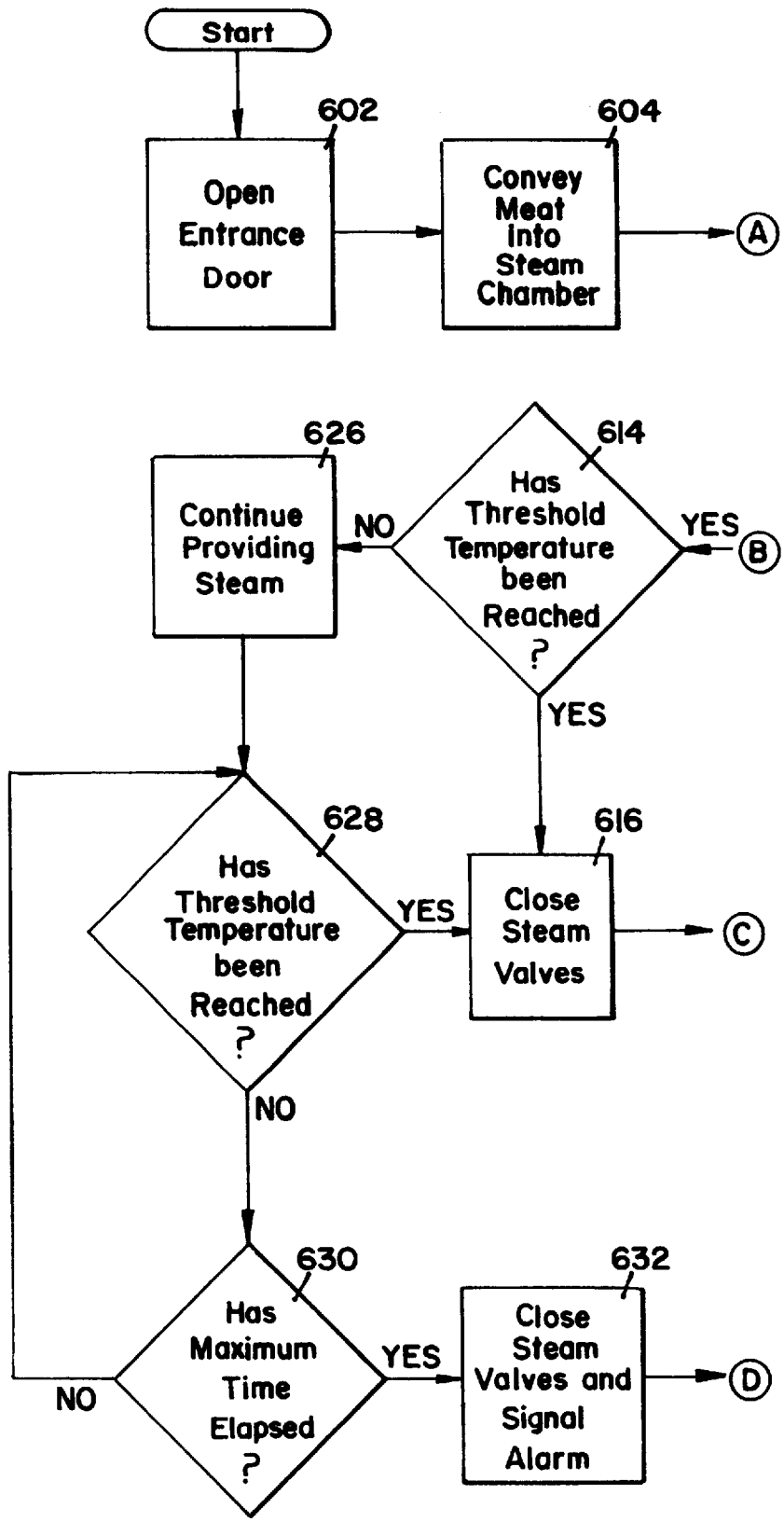
FIGS. 15A and 15B illustrate a flow chart of one method for a steam pasteurization portion of a process of the present invention.
Figure 15B:
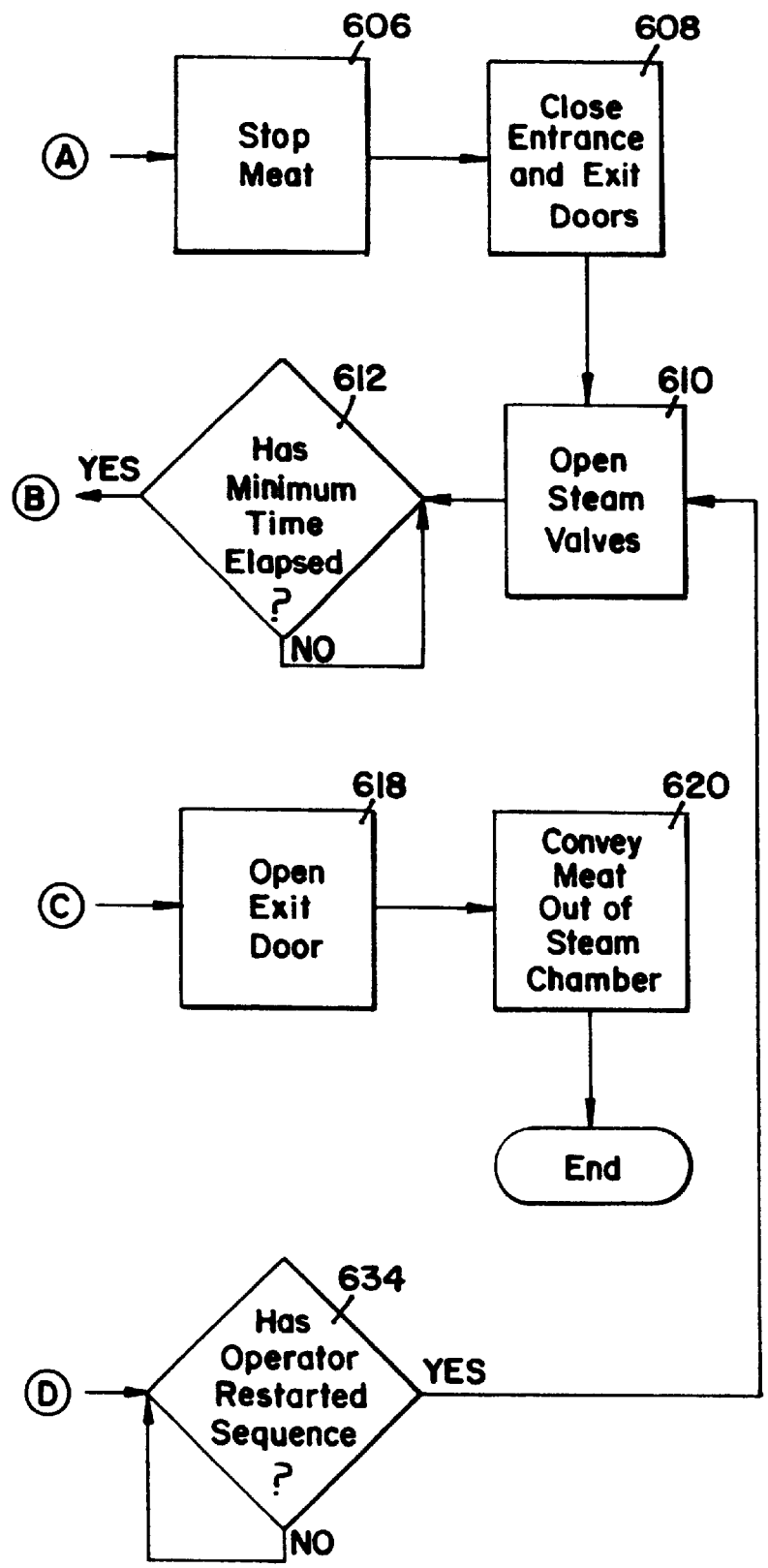

FIGS. 15A and 15B illustrate a flow chart for a steam pasteurization portion of the process that provides improved control over the heating of the meat. The apparatus of FIGS. 5–8 is used to exemplify this method, however other apparatuses may also be used. It will be understood that other portions of the process may be added including conveying the meat into and/or through the dewatering station 112, operating the dewatering valves to remove surface water from the meat, conveying the meat into and/or through the coolant chamber 116, and operating the coolant nozzles 162 to cool the meat after steam pasteurization.

This process can be implemented, for example, manually or by software and/or hardware in the controller 502. The process uses three input parameters including a minimum pasteurization time, a maximum pasteurization time, and a threshold pasteurization temperature. The process begins by opening the entrance door (step 602) and directing the conveyor 120 to convey the meat into the steam chamber 114 (step 604). The conveyor 120 is then directed to stop the movement of the meat when the meat is in the steam chamber 114 (step 606). The entrance and exit doors 154, 156 are then closed (step 608) and one or more steam valves are opened (step 610).

The controller 502 monitors the time from opening the steam valves to determine when the minimum pasteurization time has elapsed (step 612). The controller 502 continuously or periodically (e.g., at regular intervals, for example, every 0.01 seconds) obtains readings from one or more temperature sensors (not shown) in the steam chamber 114 to determine if the threshold pasteurization temperature has been reached. Alternatively, the controller 502 may obtain readings from the one or more temperature sensors when the minimum pasteurization time has elapsed.

The one or more temperature sensors may be, for example, thermocouples or other temperature measurement devices. The one or more temperature sensors may be placed at a variety of places in the steam chamber 114, including, for example, near the top of the steam chamber (e.g., an infeed sensor), near the bottom of the steam chamber (e.g., an outfeed sensor), or proximate to the meat. Temperature sensors may be provided, for example, at both the top and bottom of the steam chamber and averaged to obtain an average temperature in the steam chamber 114. In some instances, two or more sensors (e.g., redundant sensors) may be provided at a position to produce an average temperature measurement at that position and/or to monitor the accuracy of the temperature measurements. The temperature provided to the controller 502 may be a single temperature measurement or an average of two or more measurements. The threshold pasteurization temperature and/or the temperature measurement from the steam chamber 114 may be adjusted according to a relationship to provide an estimate of the temperature at the surface of the meat based on the distance and position of the sensors.

If the threshold pasteurization temperature is reached prior to or at the minimum pasteurization time, the steam valves are closed (step 616) and the exit door is opened (step 618). Optionally, the entrance door is simultaneously opened with the exit door. The conveyor 620 is directed to restart the movement of the meat and convey the meat to the coolant chamber 116 (step 620) and optionally a second group of meat is conveyed into the steam chamber 114.

If the threshold pasteurization temperature is not reached, the steam valves remain open (step 626). The controller continues to query whether the threshold pasteurization temperature is reached (step 628) and whether the maximum pasteurization time has elapsed (step 630). If the threshold pasteurization temperature is reached, the steam valves are closed (step 616), the exit door is opened (step 618), and the conveyor is directed to restart the movement of the meat and convey the meat to the coolant chamber 116 (step 620). In some instances, a maximum pasteurization time is not provided and the controller continues to leave the steam valves open until the threshold pasteurization temperature is reached.

If the maximum pasteurization time elapses and the threshold pasteurization temperature is not reached, then the steam valves are closed and an alarm is activated to alert the operator 501 (step 632). The operator 501 must then restart the pasteurization sequence (step 634) which reopens the steam valves (step 610) and resets the pasteurization time. Alternatively, the controller 502 may not wait for the operator to restart the pasteurization sequence, but instead the controller 502 may restart the pasteurization sequence automatically. The alarm (if present) may alert the operator 501 that the apparatus 110 is not functioning correctly and allow the operator 501 to fix the apparatus prior to continuing to process meat. The alarm may be, for example, an auditory and/or visual alarm and may be provided, for example, on an operator's console and/or within the space containing the apparatus.

Previously, the temperature in the steam region has not been used as feedback to direct a controller to continue processing the meat until that temperature had been reached. This could result in passing meat through the steam pasteurization process without ensuring that the meat had been adequately pasteurized to decontaminate the surface of the meat. The method illustrated in FIGS. 15A and 15B is advantageous because a temperature in the steam chamber 114 is monitored to determine that a threshold temperature has been met or that the operator is notified. This can further ensure that the meat has been adequately pasteurized. In an alternative embodiment, the operator is notified if the temperature in the steam region does not reach the threshold pasteurization temperature within the minimum pasteurization time and the steam valves are optionally turned off until reset by the operator.

Figure 16A:
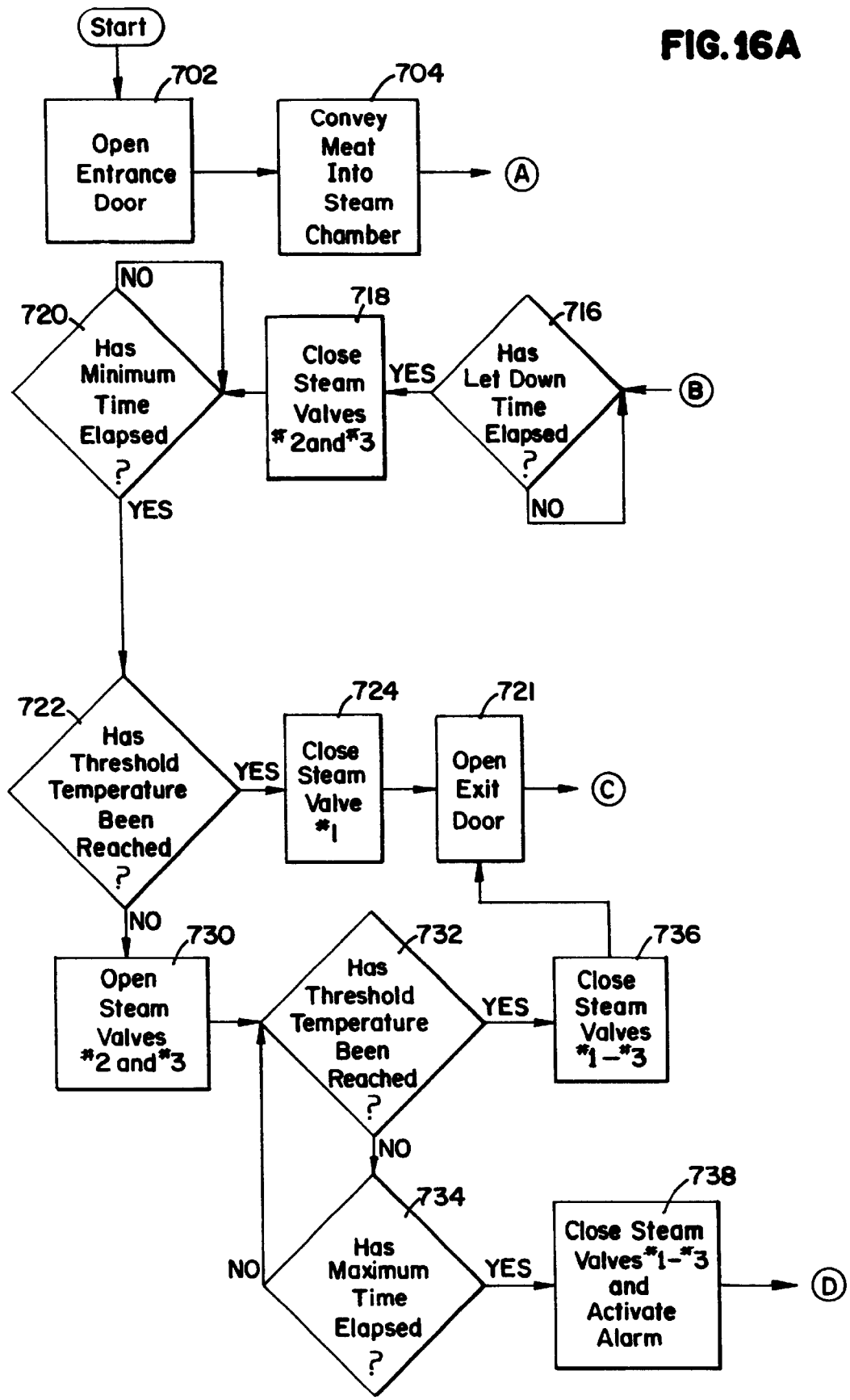
FIGS. 16A and 16B illustrate a flow chart of a second method for a steam pasteurization portion of a process of the present invention.
Figure 16B:
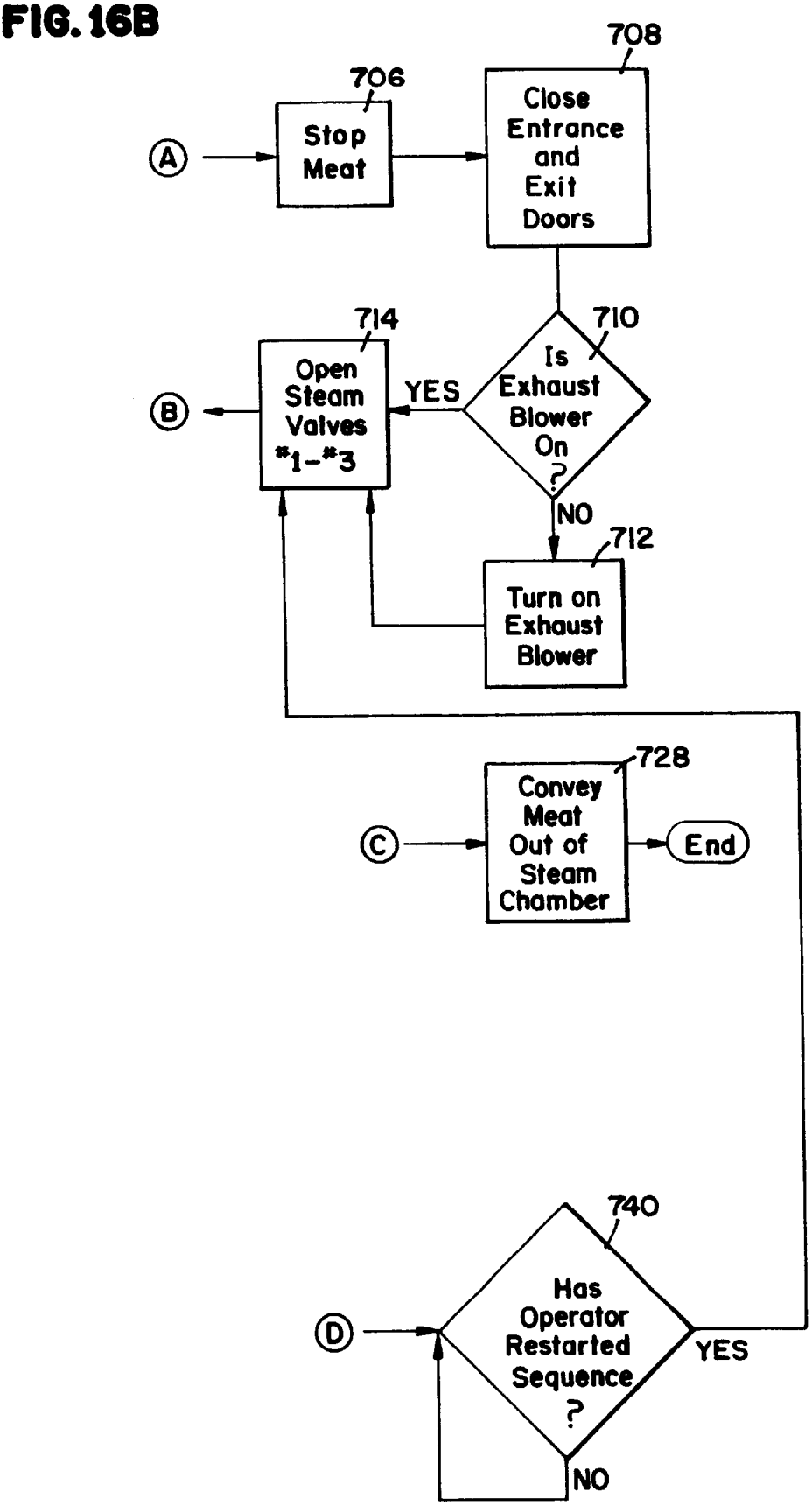

FIGS. 16A and 16B illustrates a second method for the steam pasteurization portion of the process. The apparatus of FIGS. 5–8 is used to exemplify this method, however other apparatuses may also be used. The method will be illustrated using three steam valves. It will be understood that the method can be adapted for use with other apparatuses that have two or more steam valves. Prior to operation, operational parameters are provided to the controller 502. These operational parameters include the valve let down time, the minimum pasteurization time, the maximum pasteurization time, and the threshold pasteurization temperature. The entrance door 154 of the steam chamber 114 is opened (step 702) and the conveyor 120 is directed to convey meat into the steam chamber (step 704). Optionally, the exit door 156 of the steam chamber 114 may be opened to allow a previous group of meat to be removed from the steam chamber 114. The conveyor 120 is directed to stop the movement of the meat (step 706) and the entrance and exit doors 154, 156 are closed (step 708). The controller 502 determines if the exhaust blower is on (step 710). If not, the controller 502 turns on the exhaust blower (step 712) or directs the operator 501 to do so.

When the exhaust blower is on, steam valves #1–3 are opened (step 714). The controller monitors the time since the steam valves were opened until the valve let down time has elapsed (step 716). Valves #1 and #3 are then closed (step 718), leaving valve #2 (between valves #1 and #3) open. The controller 502 continues to monitor the time until the minimum pasteurization time has elapsed (step 720). The controller 502 then queries one or more temperature sensors in the steam chamber to determine if the threshold pasteurization temperature has been reached (step 722).

If the threshold pasteurization temperature has been reached, steam valve #1 is closed (step 724). The exit door 156 is opened (step 726) and the conveyor is directed to restart the movement of the meat out of the steam chamber 114 (step 728) and into the coolant chamber 116. Optionally, the entrance door 154 may be opened to convey a new group of meat from the dewatering station 112 to the steam chamber 114.

If the threshold pasteurization temperature is not reached by the minimum pasteurization time, steam valves #1 and #3 are opened (step 730). The controller continues to monitor whether the threshold pasteurization temperature is reached (step 732) and whether the maximum pasteurization time has elapsed (step 734). If the threshold pasteurization temperature is reached, steam valves #1–3 are closed (step 736), the exit door is opened (step 726), and the conveyor is directed to restart the movement of the meat out of the steam chamber 114 to the coolant chamber 116 (step 728).

If the threshold pasteurization temperature is not reached before the maximum pasteurization time has elapsed, steam valves #1–3 are closed and an alarm is activated (step 738). The operator 501 must then restart the pasteurization sequence (step 740) to again open steam valves #1–3 (step 714) and restart the pasteurization time. Alternatively, the controller 502 may automatically restart the pasteurization sequence.

In some embodiments, the controller may also include a cold valve let down time that is used instead of the valve let down time, particularly when the apparatus has been sitting idle for a period of time. In such instances, the apparatus may be cool and require additional steam to heat the walls, valves, and other components of the apparatus to reach a sufficient temperature to heat the meat.

As an example of suitable times for each of the parameters, the cold valve let down time can be from, for example, 3 to 7 seconds and the hot valve let down time can be from, for example 1 to 4 seconds. The threshold pasteurization temperature can be from, for example, 165 to 205° F. The minimum pasteurization time can be from 4 to 10 seconds and the maximum pasteurization time can be from 12 to 18 seconds. However, other values of these parameters may be used depending on a variety of factors, including, for example, the type of meat being processed, the size of the meat being processed, the size of the apparatus, the size of the steam region, the temperature of the steam, the distance from the steam inlet to the meat, and the expected amount of surface contamination.

The apparatus 110 may be used as illustrated, for example, in FIGS. 5–8. Alternatively, one or more, and preferably all, of the components related to the movement of the steam chamber 114 may be removed including, for example, the support wheels 144, the chamber drive 146, the pinion 148, the racks 150, and the guide wheels 152. As another alternative, the apparatus 110 can be made without one or more, and preferably any, of these items. In addition, an apparatus may not need two sets of walls for the steam chamber, because the chamber does not move. It will be understood that other apparatuses can be made that incorporate the features of the invention.

The apparatus 110 may also include safety features including sensors (e.g., light, heat, or pressure sensors) around and/or in the apparatus, especially around or in the steam chamber that indicate when a person may be near or in the steam chamber to prevent exposure to hot steam. In addition, an operator's panel may include a switch to halt the operation of the apparatus and other switches may be placed where convenient or desired to be thrown, for example, in emergency situations.

In other embodiments, the movement of the meat through the steam region may not be stopped, particularly if the movement of the meat through the steam region takes at least as long as the minimum pasteurization process. In some instances, the movement of the meat may be slowed. In any case, the steam region remains stationary relative to the rest of the apparatus. In some of these embodiments, the controller may monitor the temperature in the steam region and if the temperature fails to achieve a threshold pasteurization temperature, the movement of the meat is stopped and steam is directed to the meat for an additional period of time and/or an alarm is activated. Additionally or alternatively, if the threshold pasteurization temperature is not achieved within a maximum pasteurization time, an alarm may be activated. If an alarm is activated, the operator may need to restart the pasteurization sequence.

The present invention should not be considered limited to the particular examples described above, but rather should be understood to cover all aspects of the invention as fairly set out in the attached claims. Various modifications, equivalent processes, as well as numerous communication devices to which the present invention may be applicable will be readily apparent to those of skill in the art upon review of the present specification. The claims are intended to cover such modifications and devices.

We claim:

1. A method of reducing surface contamination of meat, comprising:
   hanging a piece of meat from a track of a conveyor, the track being generally horizontal and defining a path for conveying the piece of meat;
   dewatering a surface of the piece of meat using a dewatering fluid;
   moving the piece of meat along the track into a steam region disposed along the path;
   stopping the piece of meat on the track in the steam region;
   directing steam into the steam region to heat the surface of the piece of meat while the piece of meat is stationary;
   moving the piece of meat along the track out of the steam region; and
   directing a coolant fluid to cool the surface of the piece of meat.

2. The method of claim 1, wherein the dewatering fluid comprises a gas.

3. The method of claim 1, wherein the steam region remains stationary relative to a remainder of an apparatus comprising the steam region.

4. The method of claim 1, further comprising monitoring a temperature in the steam region.

5. The method of claim 4, further comprising discontinuing directing steam into the steam region when the temperature in the steam region has achieved at least a threshold pasteurization temperature and the steam has been directed to heat the surface of the piece of meat for a minimum pasteurization time.

6. The method of claim 4, further comprising activating an alarm if (a) the temperature in the steam region does not achieve a threshold pasteurization temperature and (b) steam has been directed to heat the surface of the piece of meat for at least a maximum pasteurization time.

7. A method of reducing surface contamination of meat, comprising:
   hanging a piece of meat from a track of a conveyor, the track being generally horizontal and defining a path for conveying the piece of meat;
   dewatering a surface of the piece of meat using a dewatering fluid;
   moving the piece of meat along the track into a steam region disposed along the path;
   stopping the piece of meat on the track in the steam region;
   opening a first steam valve and a second steam valve to direct steam into the steam region to heat the surface of the piece of meat;
   moving the piece of meat along the track out of the steam region using the conveyor; and
   directing a coolant fluid to cool the surface of the piece of meat.

8. The method of claim 7, further comprising closing the second steam valve, leaving the first steam valve open, after a valve let down time is reached as measured from the opening of the first and second steam valves.

9. The method of claim 7, further comprising measuring a temperature in the steam region.

10. The method of claim 9, further comprising closing the first steam valve if (a) the temperature in the steam region achieves at least a threshold pasteurization temperature and (b) the first steam valve has been open for at least a minimum pasteurization time.

11. The method of claim 10, further comprising closing the second steam valve at a valve let down time that is shorter than the minimum pasteurization time.

12. The method of claim 11, further comprising reopening the second steam valve if the temperature in the steam region does not achieve at least a threshold pasteurization temperature after the first steam valve has been open for at least a minimum pasteurization time.

13. The method of claim 12, further comprising closing the first and second steam valves if the temperature in the steam region achieves at least the threshold pasteurization temperature after the first steam valve has been open for at least a minimum pasteurization time.

14. The method of claim 12, further comprising activating an alarm if the temperature in the steam region does not achieve at least a threshold pasteurization temperature when the first steam valve has been open for at least a maximum pasteurization time.

15. An apparatus for reducing surface contamination of meat, comprising:
- a conveyor comprising a generally horizontal track configured and arranged for conveying a piece of meat hung from the track, the track defining a path for conveying the piece of meat;
- a dewatering region disposed along the path having at least one dewatering element for directing a dewatering fluid at a piece of meat to remove surface water from the meat;
- a steam region disposed along the path having at least one steam valve for directing steam at the piece of meat on the track to heat the surface of the meat;
- a coolant region disposed along the path having at least one coolant element for directing a coolant fluid at the piece of meat to cool the surface of the piece of meat; and
- a controller configured and arranged to control the conveyor to move the piece meat from the dewatering regions to the steam region, to stop the piece of meat in the steam region while steam is directed at the piece of meat, and to move the meat from the steam region to the coolant region.

16. The apparatus of claim 15, wherein the controller comprises at least one of a programmable circuit, a hardwired circuit, or a firmware that is configured and arranged to control the conveyor.

17. The apparatus of claim 15, wherein the conveyor is coupled to the controller for moving the meat from the dewatering region to the steam region and from the steam region to the coolant region.

18. The apparatus of claim 15, further comprising at least one temperature sensor in the steam region of the apparatus.

19. The apparatus of claim 15, wherein the controller is configured and arranged to read the temperature sensor and to control the conveyor using at least one reading from the temperature sensor.

20. The apparatus of claim 19, wherein the steam region has a first steam valve and a second steam valve and the first and second steam valves are coupled to the controller and the controller is configured and arranged to open the first and second steam valves when the piece of meat is moved into the steam region and to close the second steam valve after a valve let down time.

21. The apparatus of claim 20, wherein the controller is configured and arranged to
   (a) close the first steam valve after a minimum pasteurization time if a threshold pasteurization temperature has been read from the temperature sensor in the steam region, or
   (b) open the second steam valve after the minimum pasteurization time if the threshold pasteurization temperature has not been read from the temperature sensor in the steam region.

22. The apparatus of claim 21, wherein the controller is configured and arranged to activate an alarm if the threshold pasteurization temperature has not been read from the temperature sensor in the steam region after the maximum pasteurization time.

23. The apparatus of claim 21, further comprising a steam inlet region, at least one first temperature sensor proximate to the steam inlet region, a steam outlet region, and at least one second temperature sensor proximate to the steam outlet region.

24. The apparatus of claim 21, wherein the steam region comprises a steam chamber within which the piece of meat is placed while steam is directed at the piece of meat.

25. The apparatus of claim 24, wherein the steam chamber is stationary, relative to the apparatus, during operation of the apparatus.

26. A method of reducing surface contamination of meat, comprising:
   opening an entrance door to a stationary steam region of a contamination-reducing apparatus;
   moving meat into the stationary steam region;
   closing the entrance door to the stationary steam region;
   directing steam at a pressure of at least 21 psia toward the meat to increase a surface temperature of the meat to destroy coliform and other pathogenic bacteria, wherein the temperature in the steam region achieves at least a threshold pasteurization temperature;
   opening an exit door to the stationary steam region; and
   moving the meat out of the steam region.

27. The method of claim 26, further comprising stopping the meat prior to directing the steam toward the meat.

28. The method of claim 26, further comprising stopping the meat only if the temperature in the steam region does not achieve the threshold pasteurization temperature while the steam is directed toward the meat.

29. The method of claim 26, further comprising immediately cooling the meat after the meat is moved out of the steam region by directing a coolant fluid at the meat.

* * * * *